United States Patent
Numata et al.

(10) Patent No.: US 6,591,175 B2
(45) Date of Patent: Jul. 8, 2003

(54) MANUAL INPUT DEVICE WITH FORCE FEEDBACK FUNCTION AND VEHICLE-MOUNTED EQUIPMENT CONTROLLER USING SAME

(75) Inventors: Hidetaka Numata, Miyagi-ken (JP); Mikio Onodera, Miyagi-ken (JP); Kenichi Seino, Miyagi-ken (JP)

(73) Assignee: Alps Electric Co., Ltd., Tokyo (JP)

(*) Notice: Subject to any disclaimer, the term of this patent is extended or adjusted under 35 U.S.C. 154(b) by 0 days.

(21) Appl. No.: 10/036,850

(22) Filed: Dec. 20, 2001

(65) Prior Publication Data
US 2002/0128753 A1 Sep. 12, 2002

(30) Foreign Application Priority Data
Dec. 22, 2000 (JP) .......................... 2000-390807
Dec. 22, 2000 (JP) .......................... 2000-390848

(51) Int. Cl.[7] .............................................. G06F 7/00
(52) U.S. Cl. .................................................. 701/36
(58) Field of Search .............................. 701/36, 51, 52, 701/53, 62, 64

(56) References Cited
U.S. PATENT DOCUMENTS
5,959,613 A  9/1999  Rosenberg et al.

FOREIGN PATENT DOCUMENTS
JP    2002-189556  * 12/2000 ............ G06F/3/023
JP    2002-189557  * 12/2000 ............ G06F/3/023

* cited by examiner

*Primary Examiner*—Yonel Beaulieu
(74) *Attorney, Agent, or Firm*—Brinks Hofer Gilson & Lione

(57) ABSTRACT

A manual input device and a vehicle-mounted equipment controller are provided. The manual input device includes: a knob secured to an operation shaft and sensing portion for detecting the operation state of the operation shaft; an actuator to apply force to the knob; a power transmission portion for transmitting power between the operation shaft and a drive shaft of the actuator; and an input/output portion to send a first signal to the external device and to receive a second signal from an external device. The device further includes a control portion for generating a control signal for the actuator in accordance with an external signal outputted from an external sensing portion, or in accordance with control information generated in accordance with, at least, the external signal. The vehicle-mounted equipment controller includes selection switches for vehicle-mounted electric equipment, function selection switches, and the manual input device to adjust functions of the vehicle-mounted electric equipment selected.

47 Claims, 17 Drawing Sheets

MANUAL INPUT DEVICE WITH FORCE FEEDBACK FUNCTION AND VEHICLE-MOUNTED EQUIPMENT CONTROLLER USING SAME

BACKGROUND

1. Field of the Invention

This invention relates to a manual input device with a force feedback function and a vehicle-mounted equipment controller using the same. More specifically, the present invention relates to control means for controlling an actuator that applies an external force as a feedback force to a knob.

2. Description of the Related Art

Conventionally, to provide a satisfying sensation while manipulating a knob and to secure the operation thereof, a manual input device with a force feedback function has been known which provides the knob with a sense of resistance and/or thrust corresponding to the amount and direction of manipulation of the knob.

Referring to FIG. 17, an example of a manual input device of the known type is illustrated. The known manual input device includes a knob 101, sensing means 102 for detecting the amount and direction of manipulation of the knob 101, and an actuator 103 for applying an external force to the knob 101. The manual input device further includes a control portion 104 which receives a detection signal a outputted from the sensing means 102 and which generates a control signal c for controlling the actuator 103, a D/A converter 105 which performs a digital-to-analog conversion of the control signal c outputted from the control portion 104, and a power amplifier 106 which amplifies an analog signal c outputted from the D/A converter 105 to provide driving power for driving the actuator 103. The control portion 104 is provided with a CPU 104a, and a memory 104b in which the control signal c corresponding to the detection signal a is stored in a table format. The CPU 104a receives the detection signal a from the sensing means 102, reads from the memory 104b the control signal c corresponding to the received detection signal a, and outputs the control signal c to the D/A converter 105.

This causes the driving of the actuator 103, so that force feedback in response to the amount and direction of manipulation of the knob 101 can be provided to the knob 101. Thus, the manual input device of this example can provide a satisfying sensation while manipulating the knob 101 and can secure the operation of the knob 101.

These kinds of manual input devices have been applied to shift-by-wire gear systems for automobiles, and function adjusting devices for various vehicle-mounted electric equipment, such as air-conditioners, radios, TVs, CD players, and navigation systems.

When the manual input device is used as a gear shifter, a force feedback function provided in the manual input device is utilized, for example, to provide a notchy feeling while shifting the shift lever. Other applications include locking means for disabling irregular operations of the shift lever from changing from one gear to another, such as shifting from P (park) to R (reverse), and from D (drive) to second. When used as a function adjusting device for vehicle-mounted electric equipment, the force feedback function provided in the manual input device is utilized to provide an adequate sense of resistance to the knob 101, thereby facilitating fine adjustment of the functions, and provides adequate thrust to the knob 101, thereby facilitating the manipulation of the knob 101.

When the manual input device is applied to the gear shifter of an automobile, the force feedback function provided in the manual input device may be used to prevent an incorrect operation of the shift lever from one position to another. In this case, however, electric power must be constantly supplied to the actuator 103 during the period of time when the shift lever is switched to a certain position, thus requiring more power consumption. Thus, in order to avoid such a disadvantage, the force feedback function, which is provided in the manual input device, may be utilized for only providing a notchy feeling while switching the shift lever. In this case, locking means for disabling the incorrect operation of the shift lever from one position to another is commonly accomplished by means of a mechanical arrangement.

However, the known manual input device is configured to control the actuator 103 merely based on the amount and direction of manipulation of the knob 101. Thus, with the locking means mechanically configured, after the locking means is released, the force feedback function of the manual input device only provides a notchy feeling while switching the shift lever, thereby permitting the switching of the shift lever from drive to reverse or drive to second, for example, while driving at even a high speed. Even if the gear shifter is mistakenly operated such that it is placed from drive into reverse while diving at a high speed, the transmission installed in the automobile does not synchronize with the operation, so that a gearshift from the drive gear to the reverse gear does not occur. However, this may cause disagreement between the engagement status of the actual gears and the shift status of the shift lever. As a result, this arrangement makes it impossible for the gear shifter to operate the transmission in a correct manner. Furthermore, an unforeseen transmission shift could occur, which may cause an accidental operation such as a sudden stop or sudden deceleration.

This holds true to the case in which the manual input device is applied to a function adjusting device for vehicle-mounted electric equipment. This is because the known manual input device described above is configured to control the actuator 103 in accordance with the amount and direction of manipulation of the knob 101, independently of the status of vehicle-mounted equipment whose functions are adjusted. The known manual input device, therefore, has problems of difficulty in appropriately adjusting the functions depending on the state of the vehicle-mounted electric equipment, thus resulting in a usability which cannot necessarily be called favorable.

SUMMARY

Accordingly, the present invention has been made to overcome the deficiencies of such known art, and an object of the present invention is to provide a manual input device having enhanced operability and reliability and being capable of providing an operation feeling that varies depending on the status of an exterior device to be operated.

To this end, according to a first aspect of the present invention, there is provided a manual input device, the manual input device includes: a knob for operating an external device; an actuator for applying an external force to the knob; a control portion for controlling the actuator; sensor for detecting the operation state of the knob; and an input/output portion for sending and receiving to send a first signal to the external device and to receive a second signal from the external device. The external device is connected to an external sensor that outputs an external signal. The control portion receives, at least, the external signal to generate a control signal for the actuator, the control signal corresponding to the external signal, thereby controlling the actuator.

In this arrangement, the actuator for applying an external force to the knob is controlled by the control signal generated in accordance with the external signal outputted from the external sensor. This allows fine-grained control of the actuator depending on the state of the external device. This arrangement, therefore, can prevent a disagreement between the driving state of the external device and the operation state of the knob, thereby enhancing the operability and reliability of the manual input device. In addition, the control portion is provided in the manual input device and all the detection signals and external signals are inputted to the control portion. This eliminates the need for making a change to the external device, thereby facilitating the application of the manual input device to the external device.

According to a second aspect of the present invention, there is provided a manual input device that includes: a knob for operating an external device; an actuator for applying an external force to the knob; a control portion for controlling the actuator; sensor for detecting the operation state of the knob; and an input/output portion to send a first signal to the external device and to receive a second signal from the external device. Upon receipt of both of a detection signal outputted from the sensor and an external signal outputted from an external sensor, the external device generates control information for the actuator, the control information corresponding to, at least, the external signal. The external device then transmits the control information to the control portion through the input/output portion, and the control portion generates a control signal for the actuator, the control signal corresponding to the control information, thereby controlling the actuator.

With this arrangement, the actuator is controlled by the control signal generated in accordance with, at least, the external signal outputted from the external sensor. This allows fine-grained control of the actuator depending on the state of the external device, thereby enhancing the operability and reliability of the manual input device. In addition, the external device generates the control information in accordance with the detection signal and external signal. This makes it possible to alleviate the burden on the control portion and also increase the speed in controlling the actuator.

According to a third aspect of the present invention, there is provided a manual input device that includes: a knob for operating an external device; an actuator for applying an external force to the knob; sensor for detecting the operation state of the knob; and an input/output portion to send a first signal to the external device and to receive a second signal the external device. Upon receipt of both of a detection signal outputted from the sensor and an external signal outputted from an external sensor, the external device generates control information for the actuator, the control information corresponding to, at least, the external signal, thereby controlling the actuator.

With this arrangement, the actuator is controlled by the control signal generated in accordance with the external signal outputted from the external sensor. This allows fine-grained control of the actuator depending on the state of the external device, thereby enhancing the operability and reliability of the manual input device. In addition, the external device generates the control signal for the actuator in accordance with the detection signal and external signal, thereby controlling the actuator included in the manual input device. It is therefore possible to eliminate the need for providing the control portion in the manual input device, thereby allowing for reductions in the size and cost of the manual input device.

According to a fourth aspect of the present invention, there is provided a manual input device that includes: a knob for operating an external device; an actuator for applying an external force to the knob; sensor for detecting the operation state of the knob; and an input/output portion to send a first signal to the external device and to receive a second signal from the external device. The external device is connected to an external sensor that outputs an external signal, and the actuator is controlled by a control signal generated in accordance with the external signal.

In this arrangement, the actuator for applying an external force to the knob is controlled by the control signal generated in accordance with the external signal outputted from the external sensor. This allows fine-grained control of the actuator depending on the state of the external device, thereby preventing a disagreement between the driving state of the external device and the operation state of the knob. This arrangement, therefore, can enhance the operability and reliability of the manual input device.

According to a fifth aspect of the present invention, there is provided a vehicle-mounted equipment controller. The vehicle-mounted equipment controller includes, at least one function selection switch for selecting a function from among a plurality of various functions to be adjusted, and a manual input device for adjusting the function selected with the function selection switch. The manual input device includes one of the manual input devices according to the first and fourth aspects.

In this arrangement, the manual input device to be installed in the vehicle-mounted equipment controller may be controlled by the control signal generated in accordance with, at least, the external signal outputted from the external sensor that is connected to the external signal. This arrangement allows fine-grained control of the actuator depending on the state of the electric equipment, thereby preventing a disagreement between the driving state of the external device and the operation state of the knob. This arrangement, therefore, can improve the operability and reliability of the vehicle-mounted equipment controller.

As described above, the vehicle-mounted equipment controller of the present invention includes, in a single housing, at least one function selection switch for selecting a function from among a plurality of various functions to be adjusted; and the manual input device for adjusting the function selected. This arrangement allows for central control of a plurality of types of vehicle-mounted electric equipment. This can facilitate the adjustment of functions of each type of the vehicle-mounted electric equipment, thus leading to enhanced safety during the operation of the automobile. In addition, the manual input device included in the vehicle-mounted equipment controller controls the control signal for the actuator in accordance with the detection signal outputted from the sensor and the external signal outputted from the external sensor. This arrangement can provide an operation feeling to the knob depending upon the state of the vehicle-mounted equipment to be adjusted, thereby improving the operability of the knob. Accordingly, the use of the vehicle-mounted equipment controller makes it possible to facilitate and secure the adjustment of functions of the electric equipment to be operated.

In the manual input device described above, the sensor is preferably coupled to an operation shaft of the knob, and the knob and the actuator are coupled via a power transmission portion. With this arrangement, because the sensing coupled to the operation shaft of the knob, it is possible to accurately detect the amount of manipulation of the knob during manipulation.

Preferably, the sensor is coupled to a drive shaft of the actuator, and the knob and the actuator are coupled via a power transmission portion. With this arrangement, because the sensing portion is coupled to the drive shaft of the actuator via the power transmission portion, the amount of manipulation of the knob during the manipulation can be detected as the amount of actuation of the actuator, thereby increasing the detection accuracy and facilitating the replacement of the knob.

Preferably, the sensor is coupled with the knob via a power transmission portion. With this arrangement, because the sensor is coupled with the knob via the power transmission portion, the versatility of connecting the sensor, actuator, and knob is enhanced.

Preferably, the knob is arranged so as to pivot in at least two directions, and the actuator comprises at least two actuators that are provided for each direction in which the knob is pivoted, via converters. With this arrangement, because the knob can pivot in at least two directions, it is possible to manipulate the knob in multi-directions.

Preferably, the knob extends in a direction perpendicular to the operation shaft of the knob, and the knob is rotated within a plane perpendicular to the operation shaft. Alternatively, the operation shaft of the knob is arranged in a horizontal direction, and the knob extends in a direction perpendicular to the operation shaft and is rotated within a plane perpendicular to the operation shaft. Optionally, the knob is a slide-type knob that is slidably operated, the power transmission portion may be integrally formed with the knob, and the sensing portion may be provided between the knob and the actuator. Preferably, the sensing portion is provided for each direction in which the knob is pivoted. With these arrangements, the knob, sensing portion, and actuator can be connected in various manners and thus can take various forms.

DESCRIPTION OF THE PREFERRED EMBODIMENTS

Embodiments of a manual input device according to the present invention will now be described.

First Embodiment of Manual Input Device

Figure 1:
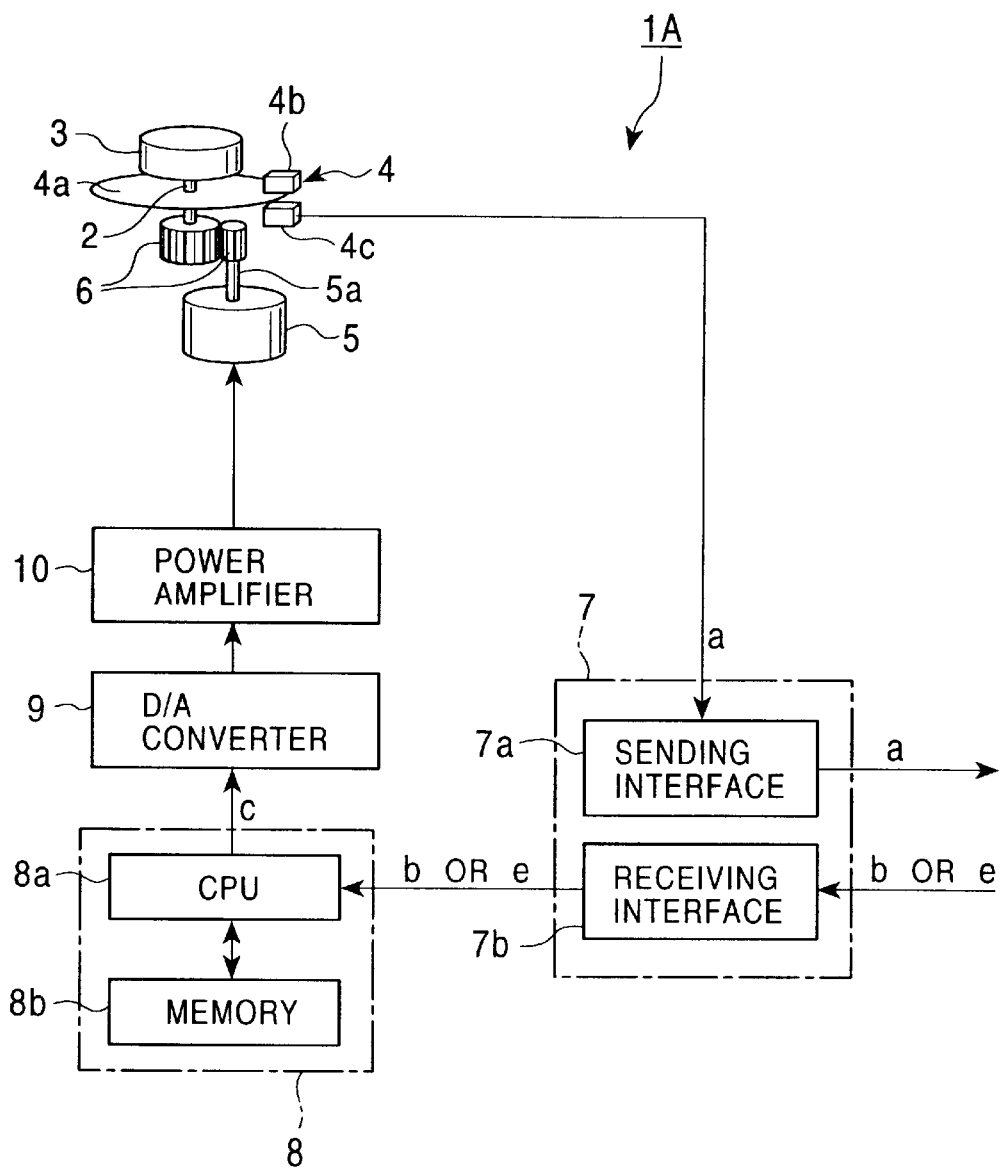
FIG. 1 is a block diagram of a manual input device according to a first embodiment of the present invention.

Referring first to FIG. 1, a manual input device 1A according to a first embodiment of the present invention is illustrated. The manual input device 1A is a rotary-type manual input device and includes: a housing (not shown); an operation shaft 2 rotatably held within the housing; a knob 3 secured to one end of the operation shaft 2; and a sensor (hereinafter referred to as a sensing means) 4, such as a rotary encoder or potentiometer, for detecting the amount and direction of rotation of the operation shaft 2. As used herein, the knob 3 may be of any shape, rounded or not, suitable for manipulation with a user's fingers or hands.

The manual input device 1A further includes: a rotary drive actuator 5, such as a DC motor or stepping motor, for applying an external force to the knob 3; a power transmission portion 6, such as gears and/or friction wheels, for transmitting power between the operation shaft 2 and the drive shaft 5a of the actuator 5; an input/output portion 7 for sending and receiving a signal to and from an external device (not shown); a control portion 8 for generating a control signal c for the actuator 5 in accordance with an external signal b outputted from an external sensing means (or sensor) that is connected to the external device (not shown), or in accordance with control information e generated in accordance with, at least, the external signal b; a D/A converter 9 for converting the control signal c, outputted from the control portion 8, from a digital signal to an analog signal; and a power amplifier 10 for amplifying the control signal c, converted to an analog signal by the D/A converter 9, to thereby provide driving power for the actuator 5. Although a D/A converter 9 is shown in FIG. 1, if a stepping motor is used as the actuator 5 the digital-analog converter 9 may be eliminated.

In FIG. 1, a rotary encoder is used as the sensing means 4. The rotary encoder in this embodiment is provided with a cord plate 4a secured to the operation shaft 2, and a light emitting element 4b and a light receiving element 4c arranged via the cord plate 4a at both surfaces thereof so as to oppose each other. Naturally, in place of the light emitting element 4b and the light receiving element 4c that are arranged individually, a photo interrupter integrating both elements 4b and 4c can be used.

The input/output portion 7 is provided with a sending interface 7a and a receiving interface 7b. The sending interface 7a sends a detection signal a, which is outputted from the sensing means 4, to the external device (not shown).

The control portion 8 is provided with a CPU 8a and a memory 8b. The memory 8b stores data and a program for analyzing the external signal b or control information e generated in accordance with the external signal b, and also stores driving data and a driving program for the actuator 5. The CPU 8a receives the external signal b or control information e and analyzes the external signal b or control information e in accordance with the data and program stored in the memory 8b. The CPU 8a then determines a control signal c corresponding to the external signal b or control information e, in accordance with the data or program stored in the memory 8b and outputs the control signal c to the D/A converter 9.

The control signal c serves as a signal corresponding to an operation feeling provided to the knob 3. Signal types include "generation of vibration", "generation of an impulse force", and "change of an applied force". For the "generation of vibration" type signal, the CPU 8a forms a control signal c representing vibration intensity, vibration profile, load time, frequency, and the like. For the "generation of an impulse force" type signal, the CPU 8a forms a control signal c representing impulse intensity, impulse profile, load time, and the like. For the "change of an applied force" type signal, the CPU 8a forms a control signal c representing the intensity of an applied force, the direction of an applied force, load time, and the like. The control information e is information converted from the content of the control signal c into a command. In addition, when the "change of applied force" is performed by the use of patterns, the control information e can include a command representing a pattern. Besides, the control information e can include a value indicating the amount of a load, the detection signal a, and a signal transmitted from other external sensing means (not shown) to the external device.

According to the manual input device of this embodiment, the control signal c for the actuator 5 is determined from the external signal b, which is transmitted from the external sensing means connected to the external device (not shown) to the CPU 8a, or is determined from the control information e generated in accordance with, at least, the external signal b. It is therefore possible to finely control the actuator 5 depending on the state of the external device. This allows the controlling of the actuator 5 so as to disable a certain operation of the knob 3 depending on the status of the external device, thereby preventing a disagreement between the driving state of the external device and the operation state of the knob 3. Accordingly, this arrangement can enhance the operability and reliability of the manual input device 1A.

Second Embodiment of Manual Input Device

Figure 2:
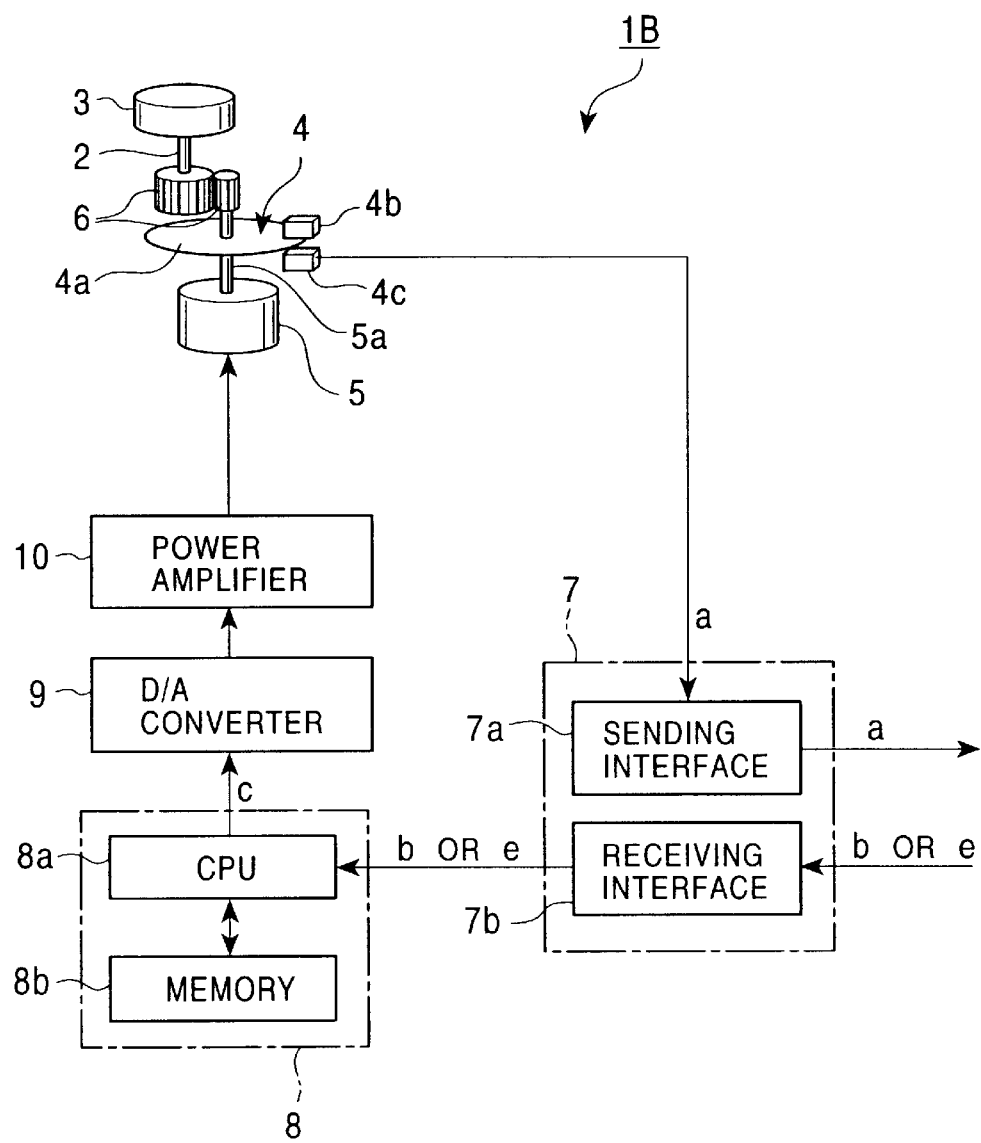
FIG. 2 is a block diagram of a manual input device according to a second embodiment of the present invention.

Referring now to FIG. 2, a manual input device 1B according to a second embodiment of the present invention is illustrated. The manual input device 1B in this embodiment is characterized in that the sensing means 4 is secured to a drive shaft 5a of the actuator 5. Since other configurations are analogous to those of the manual input device 1A according to the first embodiment, corresponding portions and elements in FIG. 2 are denoted by the same reference numerals shown in FIG. 1, and the description thereof will be omitted for simplicity. The manual input device 1B of this embodiment provides similar advantages as with the manual input device 1A according to the first embodiment.

Third Embodiment of Manual Input Device

Figure 3:
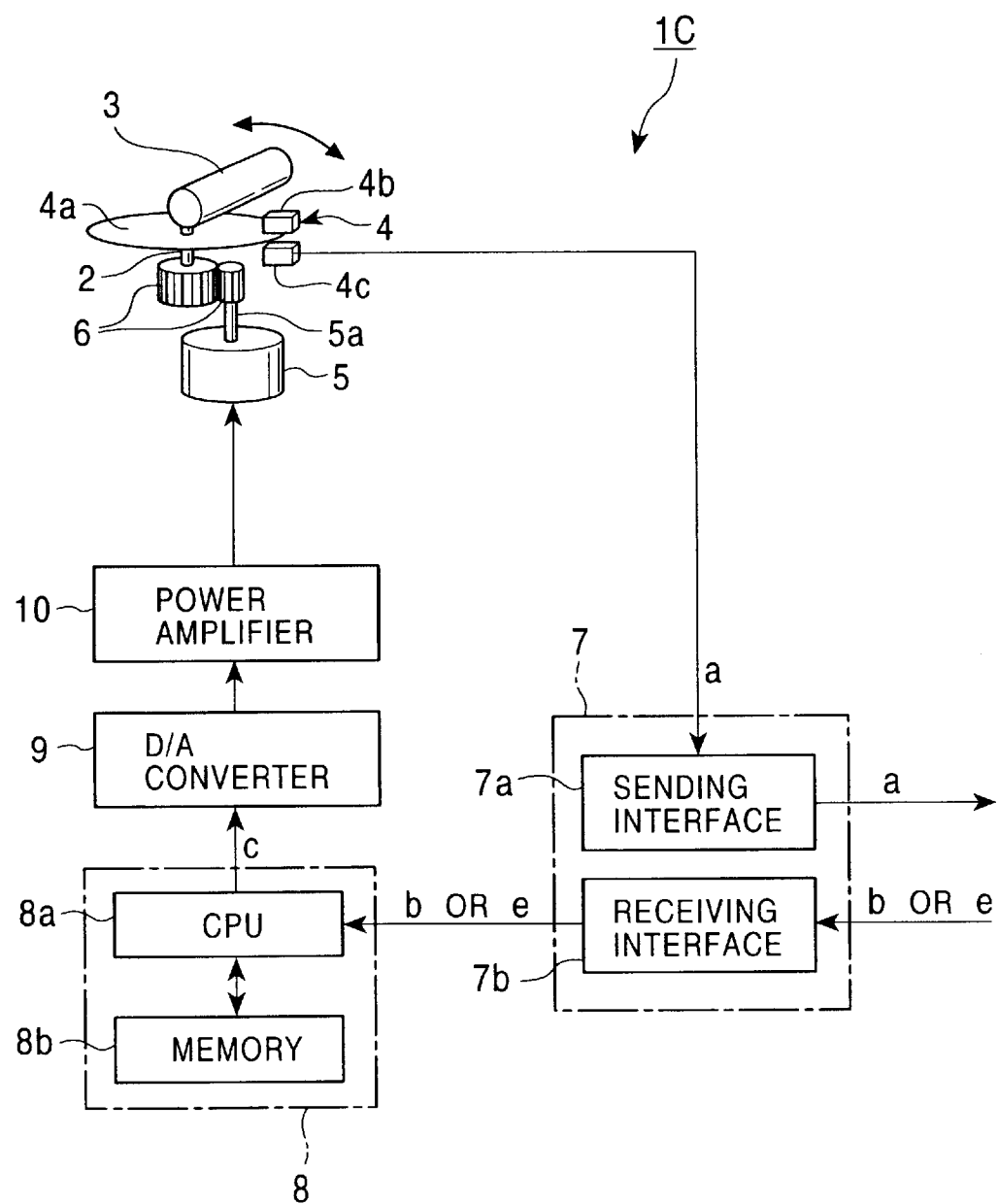
FIG. 3 is a block diagram of a manual input device according to a third embodiment of the present invention.

Referring to FIG. 3, a manual input device 1C according to a third embodiment of the present invention is illustrated. The manual input device 1C of this embodiment is characterized in that a lever-type knob 3 that rotates within a horizontal plane is provided at one end of the operation shaft 2. Since other configurations are analogous to those of the manual input device 1A according to the first embodiment, corresponding portions and elements in FIG. 3 are denoted by the same reference numerals shown in FIG. 1, and the description thereof will be omitted. The manual input device 1C of this embodiment provides similar advantages as with the manual input device 1A according to the first embodiment.

Fourth Embodiment of Manual Input Device

Figure 4:
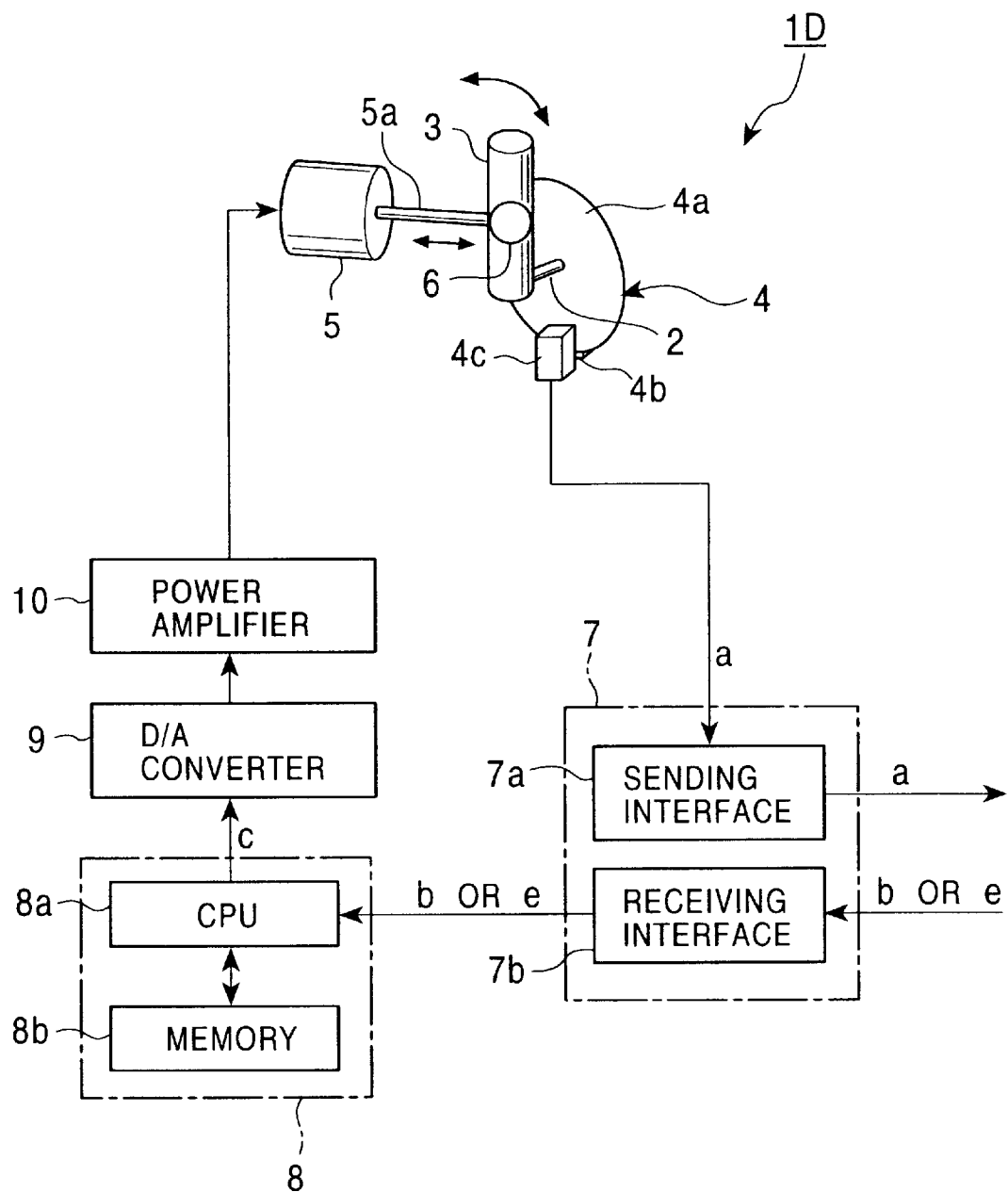
FIG. 4 is a block diagram of a manual input device according to a fourth embodiment of the present invention.

Referring to FIG. 4, a manual input device 1D according to a forth embodiment of the present invention is illustrated. The manual input device 1D of this embodiment is characterized in that the operation shaft 2 is disposed horizontally and is secured at one end thereof to a lever-type knob 3 that rotates within a vertical plane, and the linear drive actuator 5 such as a solenoid or linear motor is coupled to the knob 3. Application of an external force (Provision of an operation feeling) to the knob 3 is performed by driving the actuator 5. Since other configurations are analogous to those of the manual input device 1A according to the first embodiment, corresponding portions and elements in FIG. 4 are denoted by the same reference numerals shown in FIG. 1, and the description thereof will be omitted. The manual input device 1D of this embodiment also provides similar advantages as with the manual input device 1A according to the first embodiment.

Fifth Embodiment of Manual Input Device

Figure 5:
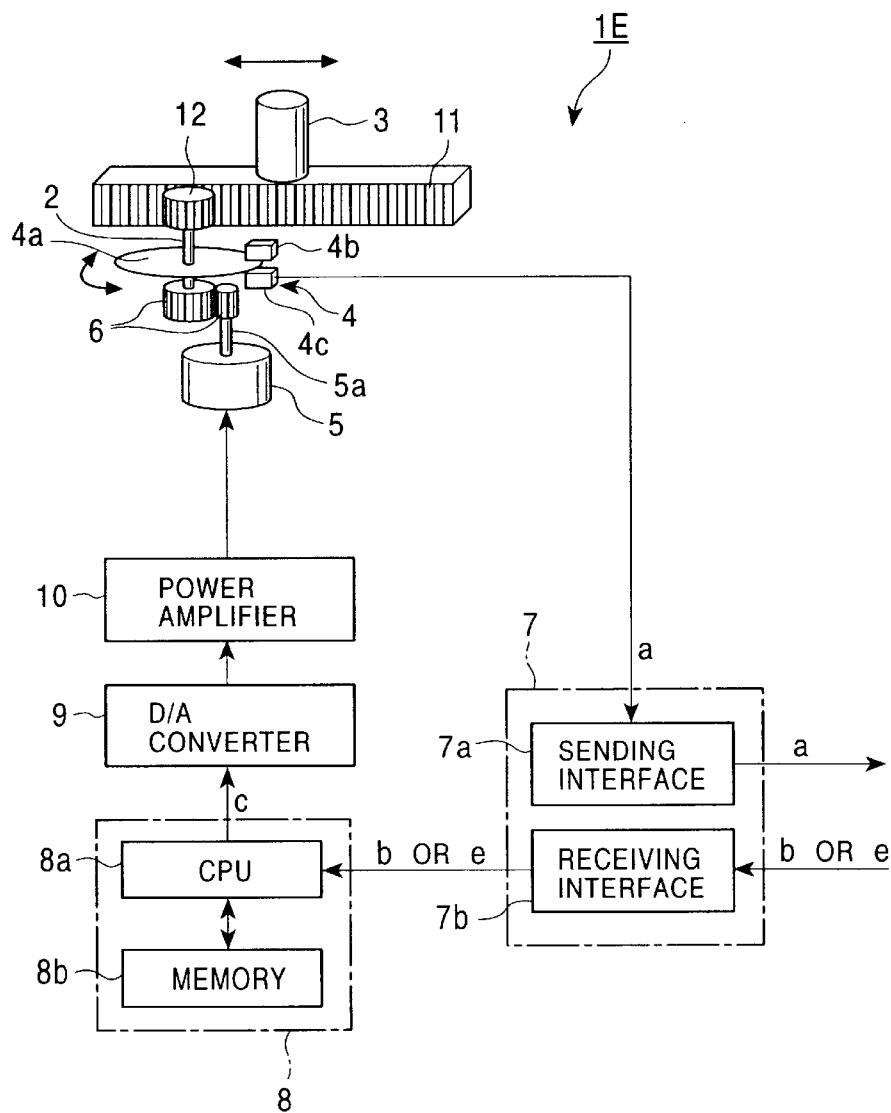
FIG. 5 is a block diagram of a manual input device according to a fifth embodiment of the present invention.

Referring to FIG. 5, a manual input device 1E according to a fifth embodiment of the present invention is illustrated. The manual input device 1E of this embodiment is a slide-type manual input device. This manual input device 1E is characterized in that the knob 3 is secured to the upper surface of a rack 11 (a power transmission portion) that is slidably held within a housing (not shown), and the rack 11 is engaged with a pinion 12 (a power transmission portion) that is secured to one end of the operation shaft 2, such that the driving force of the knob 3 is transmitted to the operation shaft 2 via the rack 11 and the pinion 12, and also such that the driving force from the actuator 5 is transmitted to the knob 3 via the gears 6, the operation shaft 2, the pinion 12, and the rack 11. Since other configurations are analogous to those of the manual input device 1A according to the first embodiment, corresponding portions and elements in FIG. 5 are denoted by the same reference numerals shown in FIG. 1, and the description thereof will be omitted. The manual input device 1E of this embodiment provides similar advantages as with the manual input device 1A according to the first embodiment. Besides, because the knob 3 is secured to the rack 11 that is slidably held within the housing, it is possible to apply the manual input device 1E to a device in which the knob thereof is linearly operated, such as a gear shifter for an automatic transmission vehicle.

Sixth Embodiment of Manual Input Device

Figure 6:
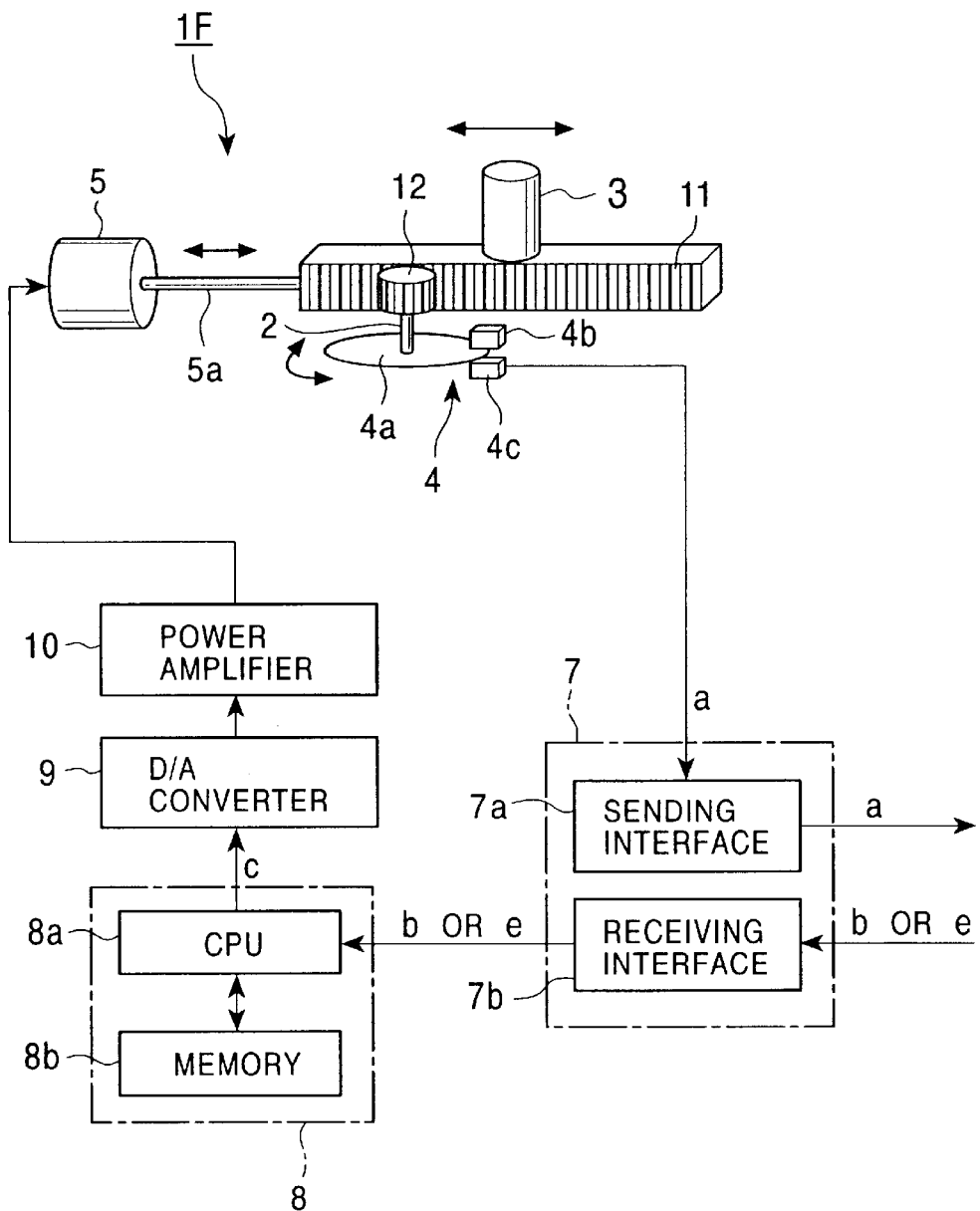
FIG. 6 is a block diagram of a manual input device according to a sixth embodiment of the present invention.

Referring to FIG. 6, a manual input device 1F according to a sixth embodiment of the present invention is illustrated. The manual input device 1F of this embodiment is also a slide-type manual input device and is characterized in that a linear drive actuator 5, such as a solenoid or linear motor, is provided as the actuator for applying an external force to the knob 3. Since other configurations are analogous to those of the manual input device 1E according to the fifth embodiment, corresponding portions and elements in FIG. 6 are denoted by the same reference numerals shown in FIG. 5, and the description thereof will be omitted. The manual, input device 1F of this embodiment provides similar advantages as with the manual input device 1E according to the fifth embodiment.

Seventh Embodiment of Manual Input Device

Figure 7:
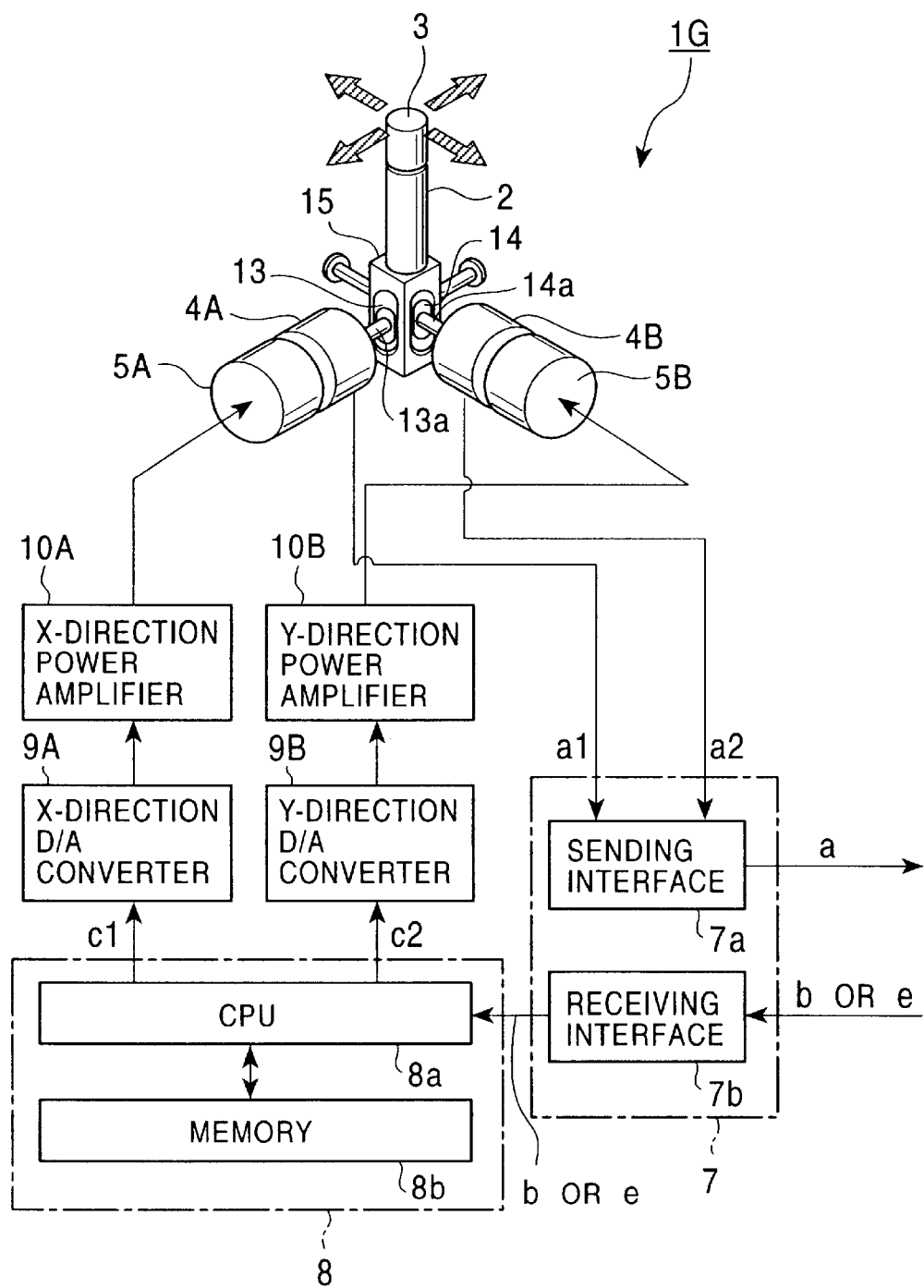
FIG. 7 is a block diagram of a manual input device according to a seventh embodiment of the present invention.

Referring to FIG. 7, a manual input device 1G according to a seventh embodiment of the present invention is illustrated. The manual input device 1G of this embodiment is a two-dimensionally operated manual input device. The manual input device 1G includes: a housing (not shown); the operation shaft 2 which is held within the housing such that the operation shaft 2 can pivot and rotate; and the knob 3 secured to one end of the operation shaft 2. The manual input device 1G further includes: a converter 15 for converting the pivoting motion of the operation shaft 2 into the amount of rotation of an x-direction rotor 13 and the amount of rotation of a y-direction rotor 14 which are arranged orthogonal to each other; x-direction sensing means 4A and y-direction sensing means 4B which are directly connected to the center shafts 13a and 14a of the rotors 13 and 14, respectively; and an x-direction rotary drive actuator 5A and a y-direction rotary drive actuator 5B, which are respectively connected to the center shafts 13a and 14b, for applying an external force to the knob 3. In addition, the manual input device 1G includes: the input/output portion 7 for sending and receiving a signal to and from an external device (not shown); a control portion 8 for generating a control signal c1 for the x-direction actuator 5A and a control signal c2 for the y-direction actuator 5B in accordance with an external signal b, which is outputted from an external sensing means connected to the external device (not shown), or in accordance with control information e generated in accordance with, at least, the external signal b, and for outputting the control signal c1 and c2; an x-direction D/A converter 9A and a y-direction D/A converter 9B which respectively perform a digital-to-analog conversion of the control signals c1 and c2 outputted from the control portion 8; and an x-direction power amplifier 10A and a y-direction power amplifier 10B for amplifying the control signal c1 and c2, which are converted by the D/A converter 9A and 9B to analog signals, to thereby provide power supply for the actuator 5A and 5B, respectively.

Rotary encoders, potentiometers, or the like can be used for the x-direction sensing means 4A and the y-direction sensing means 4B. DC motors, stepping motors, or the like can be used for the x-direction actuator 5A and the y-direction actuator 5B. Other configurations, including the input/output device 7 and the control portion 8 as well as the control signals c1 and c2 outputted from the control portion 8, are substantially analogous to those of the manual input device 1A according to the first embodiment. Thus, corresponding portions and elements in FIG. 7 are denoted by the same reference numerals shown in FIG. 1 and the description thereof will be omitted. The manual input device 1G of this embodiment provides similar advantages as with the manual input device 1A according to the first embodiment. The manual input device 1G can be applied to devices in which a knob is pivoted in a two dimensional direction, such as remote controllers for various electric equipment.

Eighth Embodiment of Manual Input Device

Figure 8:
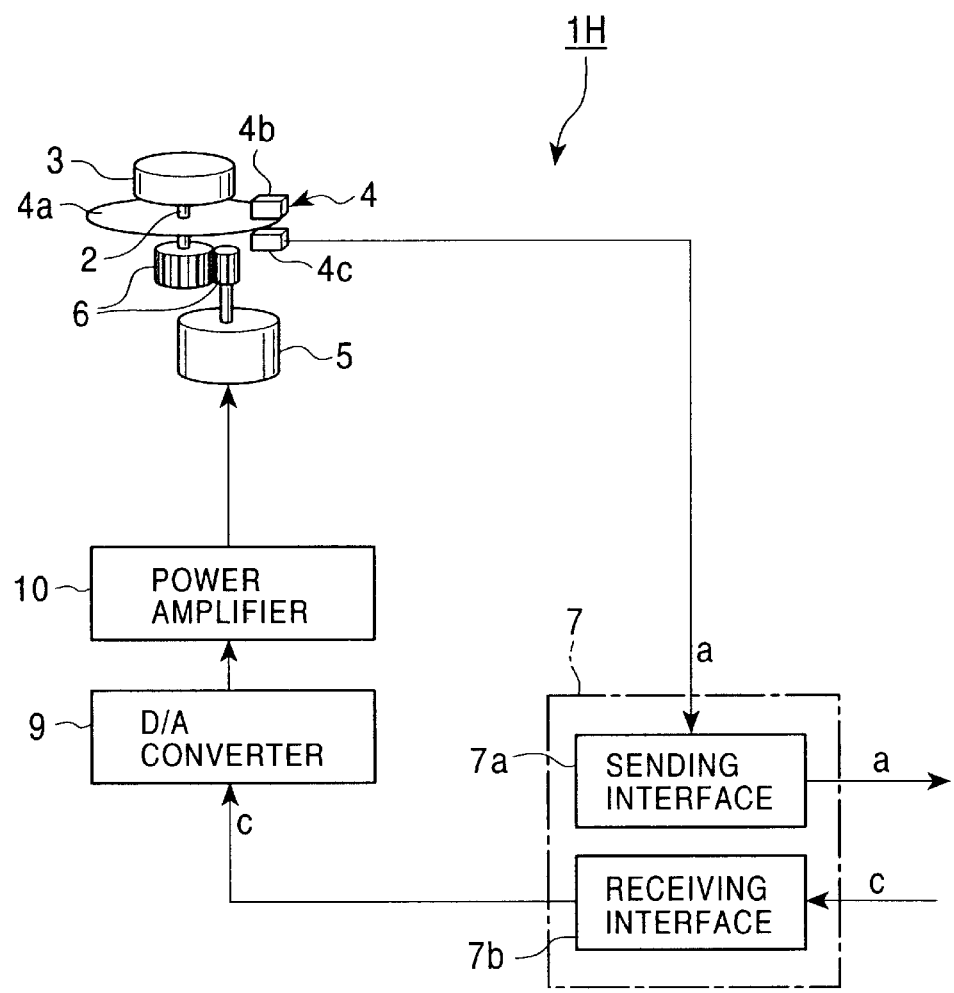
FIG. 8 is a block diagram of a manual input device according to an eighth embodiment of the present invention.

Referring to FIG. 8, a manual input device 1H according to an eighth embodiment of the present invention is illustrated. The manual input device 1H of this embodiment is characterized in that the control portion 8 of the manual input device 1A according to the first embodiment shown in FIG. 1 is eliminated. Since other configurations are analogous to those of the manual input device 1A according to the first embodiment, corresponding portions and elements in FIG. 8 are denoted by the same reference numerals shown in FIG. 1, and the description thereof will be omitted. In the manual input device 1H, control means provided in an external device (not shown) controls the actuator 5 (the x-direction actuator 5A and the y-direction actuator 5B for the manual input device 1G according to the seventh embodiment). Thus, the manual input device 1H provides similar advantages as with the manual input device 1A according to the first embodiment. The control portions 8 of the manual input devices 1B and 1G according to the second and seventh embodiments can also be eliminated.

Modifications of Manual Input Device

1. Although, in each of the embodiments described above, the control signal c for the actuator 5 is generated in accordance with the external signal b, which is outputted from the external sensing means connected to the external device, or in accordance with the control information e generated in accordance with, at least, the external signal b, the present invention is not limited to that mode. For example, the control signal c for the actuator 5 can be generated in accordance with an external signal outputted from other external sensing means that is not connected to the external device in addition to the detection signal a and/or the external signal b.

2. While the control portion 8 of the manual input device 1A according to the first embodiment is eliminated in the eighth embodiment, the control portion 8 of each of the manual input devices 1B to 1G according to the second to seventh embodiments can also be eliminated in the same manner.

3. The shape of the knob 3, the arrangement of the operation shaft 2 relative to the housing, and the types of the sensing means 4 and the actuator 5 are not limited to the combination exemplified in each embodiment, and also can be any combination as required, First Application Example of Manual Input Device As a first application example of the manual input device, a variable speed controller for an automatic transmission vehicle to which the slide-type manual input device 1E according to the fifth embodiment is applied will be described below with reference to FIG. 9.

Figure 9:
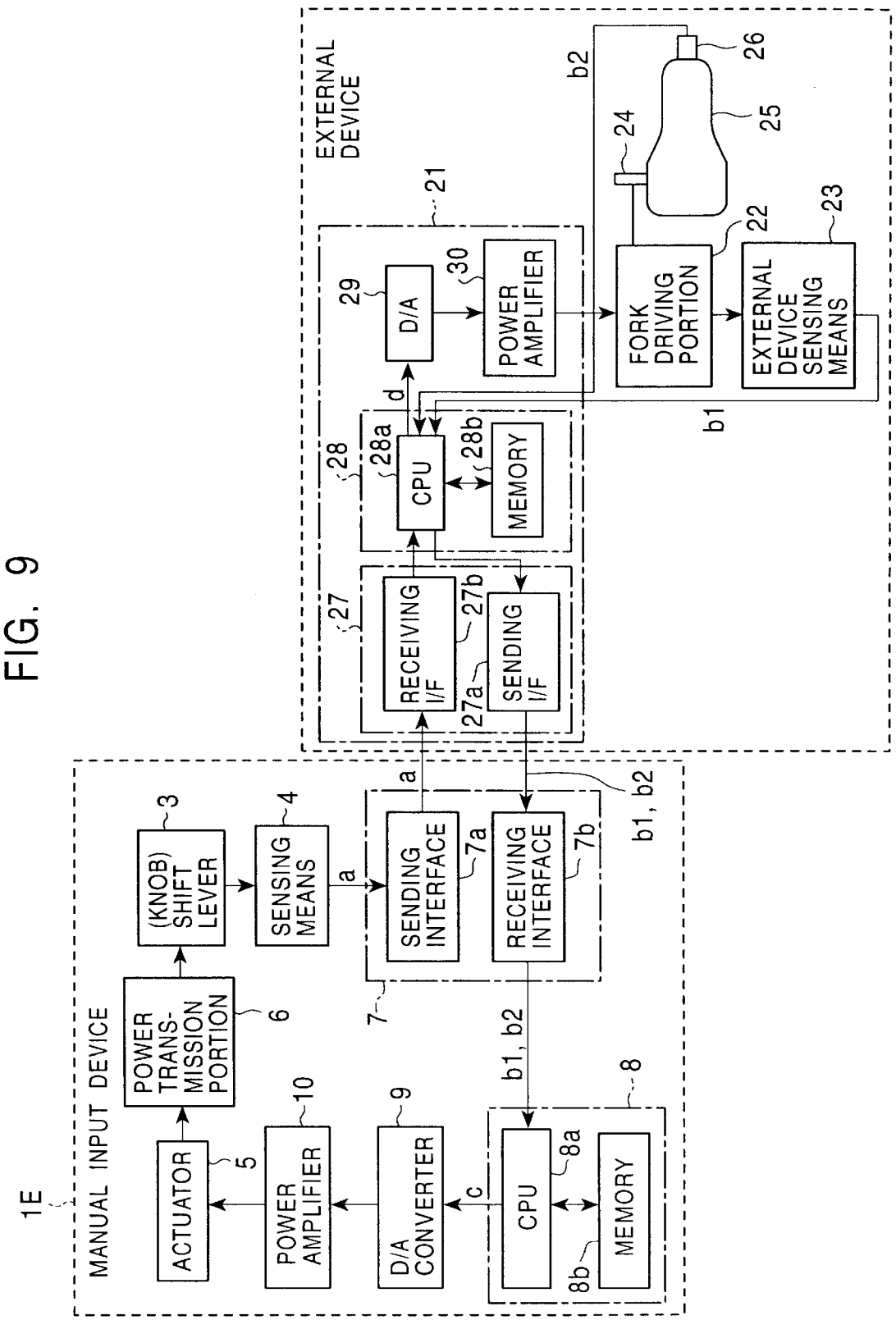
FIG. 9 is a block diagram of a first application example of the manual input device.

As shown in FIG. 9, a variable speed controller of this example includes an external device that is connected to the input/output portion 7 of the manual input device 1E. This external device includes a transmission controller 21, a fork driving portion 22 having an actuator such as a solenoid or linear motor which is controlled by the transmission controller 21, and external device sensing means 23 such as an encoder or potentiometer for detecting the driving state of the driving portion 22, and a fork switch 24 which is operated by the driving portion 22. The external device further includes a transmission 25 having gears whose engagement is switched by the fork switch 24, and a revolution sensor 26 for detecting the RPM of the output shaft of the transmission 25. In this example, the knob 3 of the manual input device 1E is installed in the cabin of a vehicle and is used as a shift knob for switching gears of the transmission 25.

The transmission controller 21 includes; an input/output portion 27 that is connected to the input/output portion 7 of the manual input device 1E; and an external device control portion 28 for generating a drive signal d for the fork driving portion 22 by using an external signal b1 outputted from the external device sensing means 23 and an external signal b2 outputted from the revolution sensor 26, and for outputting the-drive signal d. The transmission controller 21 further includes: a D/A converter 29 for performing a digital-toanalog conversion of the drive signal d, which is outputted from the external device control portion 28; and a power amplifier 30 for amplifying the drive signal d, which is converted into an analog signal by the D/A converter 29, to provide driving power to the fork driving portion 22. The use of a stepping motor for the fork driving portion 22 can eliminate the need for the D/A converter 29.

The input/output portion 27 is provided with a receiving interface 27b that is connected to the sending interface 7a of the input/output portion 7 included in the manual input device 1E. The input/output portion 27 is also provided with a sending interface 27a that is connected to the receiving interface 7b of the input/output portion 7 in the manual input device 1E. The external device control portion 28 is configured with a CPU 28a and a memory 28b. The memory 28b stores data and a program for analyzing the external signals b1 and b2, and driving data and a driving program for the fork driving portion 22. The CPU 28a receives the external signals b1 and b2, and analyzes the external signals b1 and b2 to determine a drive signal d corresponding to the external signal b1 and b2, based on the data and program stored in the memory 28b. The CPU 28a sends the external signals b1 and b2 to the control portion 8 of the manual input device 1E through the sending interface 27a and the receiving interface 7b.

The operation of the variable speed controller configured as explained above will be described below.

When the knob 3 is manipulated, the sensing means 4 detects the amount and direction of manipulation of the knob 3 to output a detection signal a corresponding to the amount and direction of manipulation of the knob 3. The detection signal a is sent to the external device control portion 28 through the sending interface 7a and the receiving interface 27b. On the other hand, the CPU 28a provided in the transmission controller 21 analyzes the detection signal a and the external signals b1 and b2 to determine the drive signal d corresponding to each of the signals a, b1, and b2, based on the data and program stored in the memory 28b, and outputs the drive signal d to the D/A converter 29. The D/A converter 29 converts the drive signal d to an analog signal and outputs the signal to the power amplifier 30. The power amplifier 30 amplifies the analog signal outputted from the D/A converter 29 and applies the resulting signal to the fork driving portion 22. This causes the fork 24 to be driven, thereby switching the gear engagement of the transmission 25 based on the content of manipulation of the knob 3. The external control portion 28 sends the external signal b1, which is outputted from the external device sensing means 23, and the external signal b2, which is outputted from the revolution sensor 26, to the control portion 8 of the manual input device 1E through the sending interface 27a and the receiving interface 7b. The control portion 8 analyzes the sent external signals b1 and b2 to determine a control signal c corresponding to the external signals b1 and b2, respectively, and outputs the control signal c to the D/A converter 9. The D/A converter 9 converts the control signal c to an analog signal and outputs the analog signal to the power amplifier 10. The power amplifier 10 amplifies the analog signal outputted from the D/A converter 9 and applies the resulting signal to the actuator 5. As a result, a load based on the external signals b1 and b2 is applied to the knob 3, so that a required operation feeling is provided to the knob 3. Thus, for example, manipulating the knob 3 to switch from one shift position to another causes a light sense of resistance to be provided from the actuator 5 to the operation shaft 2. This makes it possible to provide a notchy feeling when manipulating the knob 3. Likewise, when the RPM of the output shaft of the transmission 25 is high, for example, manipulating the knob 3 to switch from drive to reverse causes a strong sense of resistance to be provided from the actuator 5 to the operation shaft 2. This makes it possible to disable the operation of the knob 3 so that an improper operation of the knob 3 can be prevented.

The arrangement of this example uses the manual input device 1E that includes the control portion 8, and also the external signals b1 and b2 are inputted in the control portion 8. This arrangement, therefore, can eliminate the need for making a change to the external device control portion 28, and thus can facilitate the application of the manual input device to the transmission controller 21 included in the external device.

The manual input device 1E according to the fifth embodiment may be replaced with the manual input device 1F according to the sixth embodiment. Such an arrangement can also provide the same advantages as described above.

Alternatively, rather than using the slide-type manual input device 1E according to the fifth embodiment or the slide-type manual input device 1F according to the sixth embodiment, the two-dimensionally operated manual input device 1G according to the seventh embodiment can be used to provide a required operation feeling to the shift knob of an automatic transmission vehicle.

In the embodiment described above, the RPM, which is outputted from the revolution sensor 26, of the output shaft of the transmission 25 is inputted in the CPU 28a; however, in conjunction with or in place of this arrangement, alternate external signal representing vehicle speed or engine RPM can be inputted. In this case, such signals representing vehicle speed or engine RPM can also be connected to the CPU 28a of the external device control portion 28 or the CPU 8a of the manual input device 1E.

Second Application Example of Manual Input Device

Figure 10:
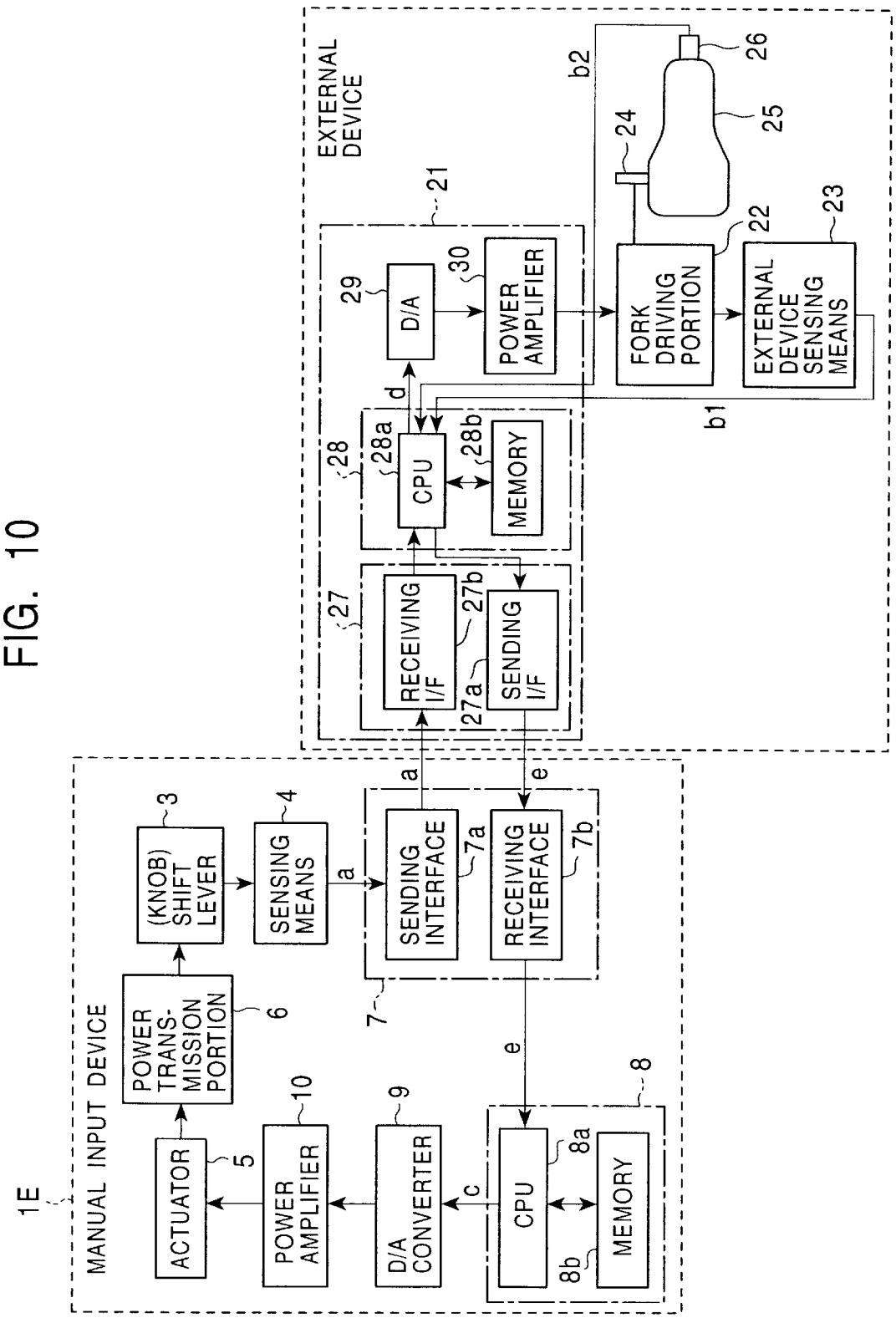
FIG. 10 is a block diagram of a second application example of the manual input device.

The second application example of the manual input device will now be described with reference-to FIG. 10. In this example, the slide-type manual input device 1E according to the fifth embodiment is also applied to the variable speed controller of an automatic transmission vehicle. However, unlike the first application example in which the external signal b1 and b2 are transmitted from the external device control portion 28 to the control portion a, this second example is characterized in that the raw detection signal a and the external signals b1 and b2, or the external signals b1 and b2 are converted to control information e that is simpler in data structure, and the control information e is sent to the control portion 8.

Thus, the memory 28b of the external device control portion 28 contains a conversion program for converting the detection signal a and the external signals b1 and b2, or the external signals b1 and b2, which are inputted to the CPU 28a, into the control information e that has a simpler data structure. The CPU 28a repeatedly activates the conversion program to convert the received detection signal a and the external signals b1 and b2, or the received external signals b1 and b2, into the control information e. The CPU 28a then sends the control information e to the control portion 8 of the manual input device 1E through the sending interface 27a and receiving interface 7b. When an alternate external signal representing vehicle speed, engine RPM, or the like is inputted, the external signal is connected to the CPU 28a of the external device control portion 28.

The CPU 8a of the manual input device 1E analyzes the control information e, determines the control signal c corresponding to the control information e in accordance with the data and program stored in the memory 8b, and outputs the control signal c to the D/A converter 9. Since other configurations and operations are analogous to those of the first application example, corresponding portions and elements in FIG. 10 are denoted by the same reference numerals shown in FIG. 9 and the description thereof will be omitted.

In this example, the control information e that is simpler in data structure than the raw detection signal a and the external signals b1 and b2, or the external signals b1 and b2 is generated by the CPU 28a provided in the external device control portion 28, and is analyzed by the control portion 8 included in the manual input device 1E. This makes it possible to alleviate the burden on the control portion 8 and to increase the speed in controlling the actuator 5.

Third Application Example of Manual Input Device

Figure 11:
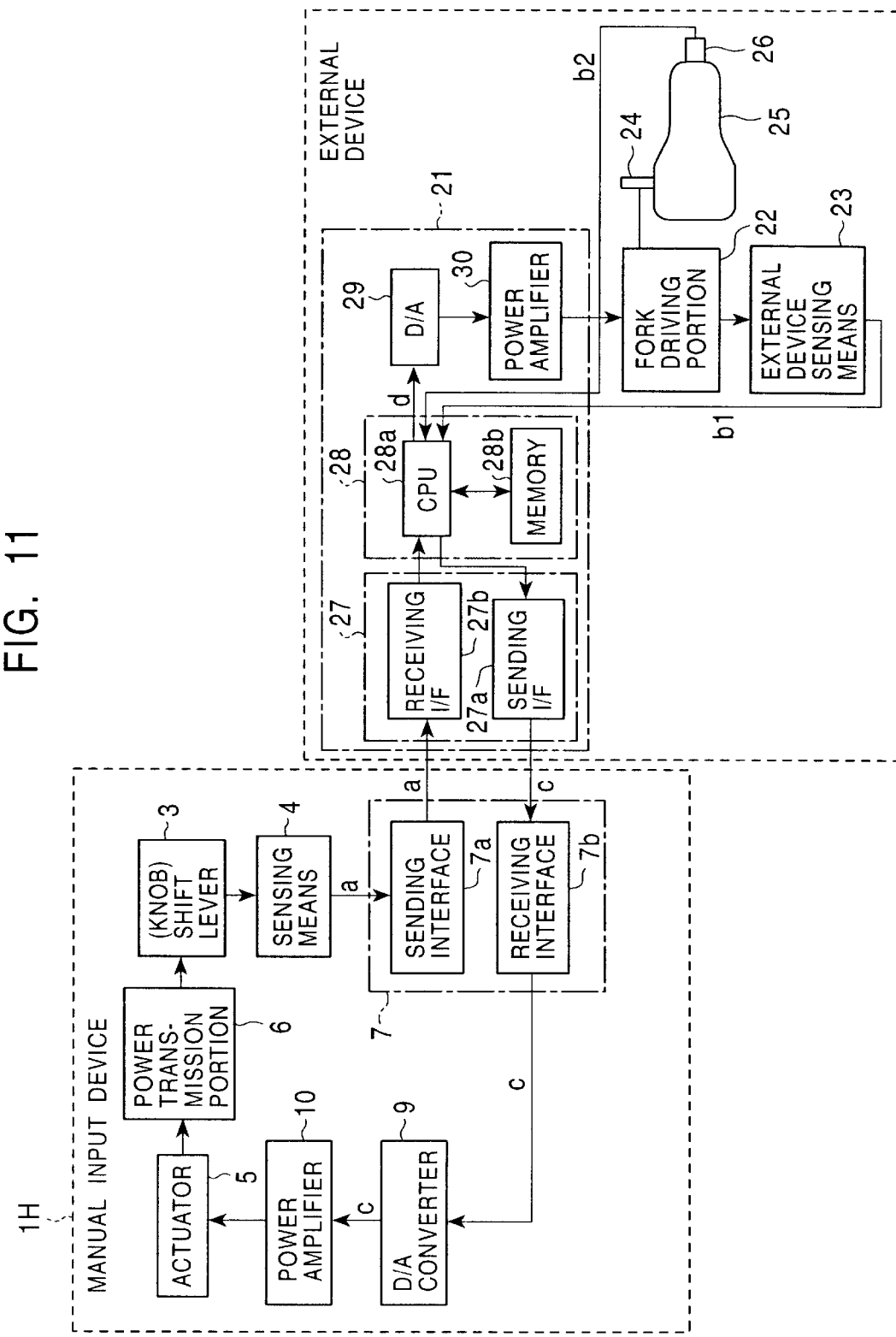
FIG. 11 is a block diagram of a third application example of the manual input device.

A third application example of the manual input device will now be described with reference to FIG. 11. In this application example, the manual input device 1H according to the eighth embodiment is applied to the variable speed controller of an automatic transmission vehicle, and is characterized in that the control signal c for the actuator 5 is transmitted from the external device control portion 28 to the manual input device 1H.

Thus, the memory 28b of the external device control portion 28 stores the data and program for analyzing the detection signal a and the external signals b1 and b2, or the external signals b1 and b2, which are inputted to the CPU 28a, as well as the driving data and driving program for the actuator 5. The CPU 28a repeatedly activates the driving program to generate the control signal c, corresponding to the inputted detection signal a and the external signals b1 and b2, or the external signals b1 and b2, for the actuator 5, and then outputs the control signal c to the D/A converter 9. Since other configurations and operations are analogous to those of the first application embodiment, corresponding portions and elements in FIG. 10 are denoted by the same reference numerals shown in FIG. 9 and the description thereof will be omitted.

In this example, the CPU 28a of the external device control portion 28 controls the actuator 5 of the manual input device 1H. This arrangement, therefore, can eliminate the need for providing the control portion in the manual input device 1H, thereby allowing for reductions in the size and cost of the manual input device.

In this embodiment, the alternate external signal representing vehicle speed or engine RPM is also connected to the CPU 28a of the external device control portion 8.

Forth Application Example of Manual Input Device

A radio to which the rotary-type manual input device 1A according to the first embodiment is applied will be described below with reference to FIGS. 12 and 13.

Figure 12:
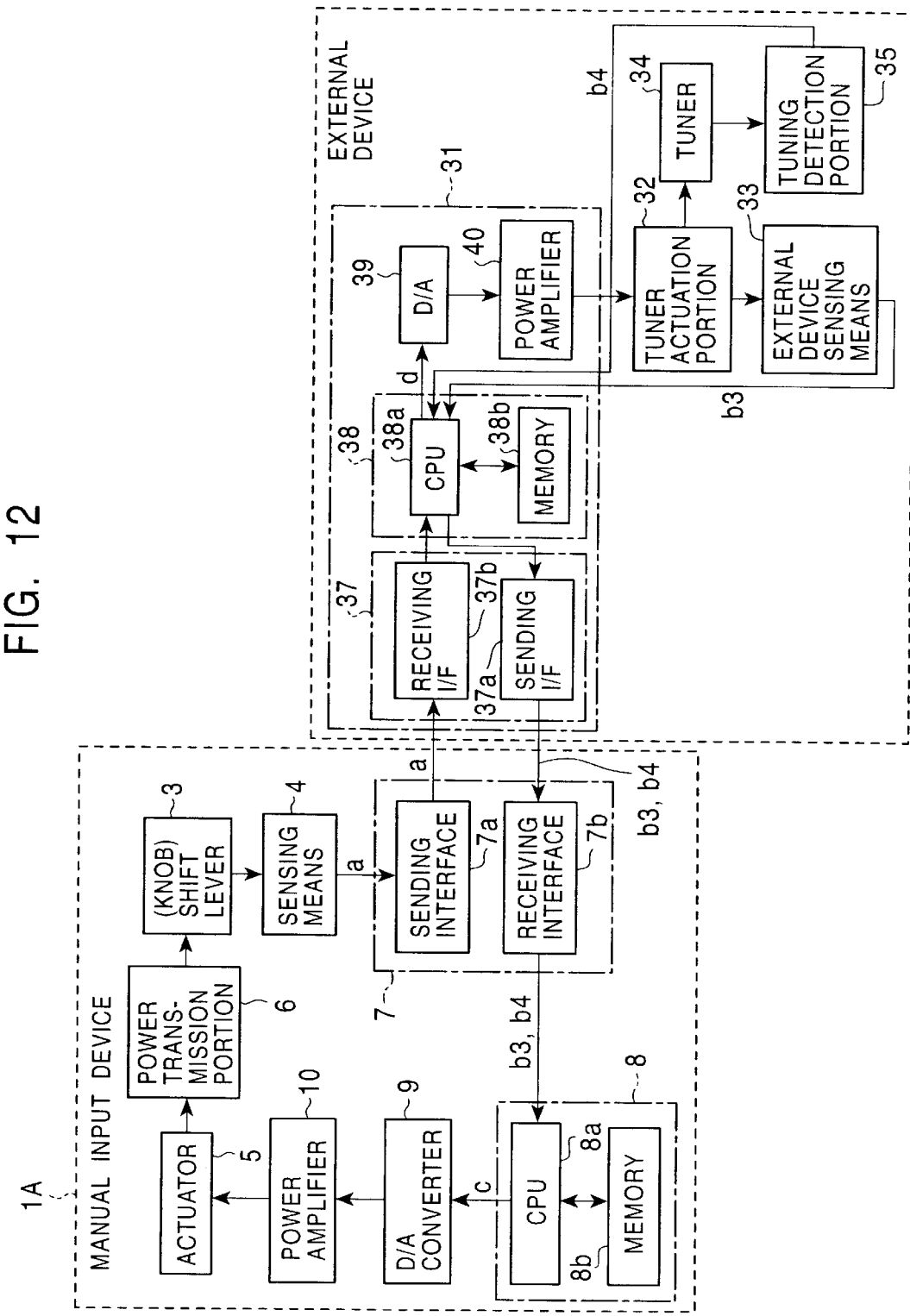
FIG. 12 is a block diagram of a forth application example of the manual input device.
Figure 13:
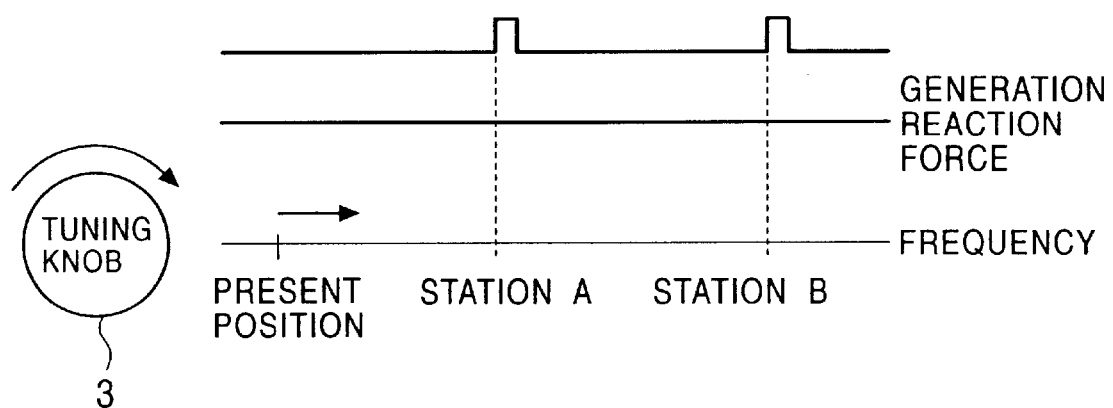
FIG. 13 is a waveform diagram showing an example of an operation feeling that is applied to a knob of the manual input device according to the forth embodiment.

As shown in FIG. 12, the radio of this embodiment includes an external device that is connected to the input/output portion 7 of the manual input device 1A. This external device includes: a radio controller 31; a tuner actuation portion 32 which has an actuator, such as a DC motor or stepping motor, and which is controlled by the radio controller 31; external device sensing means 33, such as an encoder or potentiometer, for detecting the actuation status of the tuner actuation portion 32; a tuner 34 which is operated by the tuner actuation portion 32; and a tuning detection portion 35 which detects when the tuner 34 is tuned into a station. In this example, the knob 3 of the manual input device 1A is arranged in the cabin of a vehicle and is used as a tuner operation knob for operating the tuner 34.

The radio controller 31 includes: an input/output portion 37 that is connected to the input/output portion 7 of the manual input device 1A; and an external device control portion 38 for generating a drive signal d for the tuner actuation portion 32 in accordance with the detection signal a outputted from the sensing means 4, an external signal b3 outputted from the external device sensing means 33, and an external signal b4 outputted from the tuning detection portion 35, and for outputting the drive signal d. The radio controller 31 further includes: a D/A converter 39 for performing a digital-to-analog conversion of the drive signal d, which is outputted from the external device control portion 38; and a power amplifier 40 for amplifying the drive signal d, which is converted to an analog signal by the D/A converter 39, to provide driving power to the tuner actuation portion 32. The use of a stepping motor for the tuner actuation portion 32 can eliminate the need for the D/A converter 39.

The input/output portion 37 is provided with a receiving interface 37b that is connected to the sending interface 7a of the input/output portion 7 included in the manual input device 1A. The input/output portion 37 is also provided with a sending interface 37a that is connected to the receiving interface 7b of the input/output portion 7 in the manual input device 1A. The external device control portion 38 is configured with a CPU 38a and a memory 38b. The memory 38b stores data and a program for analyzing the detection signal a and the detection signals b3 and b4, and a driving data and driving program for the tuner actuation portion 32. The CPU 38a receives the detection signal a and the external signals b3 and b4, and analyzes the detection signal a and the external signals b3 and b4 to determine a drive signal d corresponding to the detection signal a and external signals b3 and b4, in accordance with the data and program stored in the memory 38b. The CPU 38a also sends the external signals b3 and b4 to the control portion 8 of the manual input device 1A through the sending interface 37a and the receiving interface 7b.

The operation of the radio controller configured as explained above will be described below.

When the knob 3 is manipulated, the amount and direction of manipulation of the knob 3 are detected by the sensing means 4 which in turn outputs the detection signal a corresponding to the amount and direction of manipulation of the knob 3. The detection signal a is sent to the external device control portion 38 through the sending interface 7a and the receiving interface 37b. The CPU 38a included in the radio controller 31 analyzes the detection signal a and the external signals b3 and b4. The CPU 38a then determines the drive signal d corresponding to each of the signals a, b3, and b4, based on the data and program stored in the memory 38b, and outputs the drive signal d to the D/A converter 39. The D/A converter 39 converts the drive signal d to an analog signal and outputs the signal to the power amplifier 40. The power amplifier 40 amplifies the analog signal, which is outputted from the D/A converter 39, and applies the resulting signal to the tuner actuation portion 32. This causes the actuation of the tuner 34, so that a desired station can be tuned into. The external device control portion 38 sends the external signal b3, which is outputted from the external device sensing means 33, and the external signal b4, which is outputted from the tuning detection portion 35, to the-control portion 8 of the manual input device 1A through the sending interface 37a and the receiving interface 7b. The control portion 8 analyzes the transmitted external signal b3 and b4, determines a control signal c corresponding to each of the signals b3 and b4 based on the data and program stored in the memory 8b, and outputs the control signal c to the D/A converter 9. The D/A converter 9 converts the control signal c to an analog signal and outputs the analog signal to the power amplifier 10. The power amplifier 10 amplifies the analog signal, which is outputted from the D/A converter 9, and applies the resulting analog signal to the actuator 5. This causes an external force corresponding to the external signal b3 and b4 to be applied to the knob 3, thereby providing a desired operation feeling to the knob 3. Thus, as shown in FIG. 13, each time the tuner 34 tunes into a station, a light sense of resistance is provided from the actuator 5 to the operation shaft 2, so that whether it is tuned into or not can be accurately communicated to the operator. When a station which is tuned with the operator receiving a light sense of resistance is not a desired one, applying a force equal to or greater than the sense of resistance to the knob 3 can facilitate the rotation of the knob 3. As a result, this arrangement allows for prompt tuning into a desired station, as compared to a tuner of an automatic scanning method in which the tuner makes a stop for each station. The radio controller 31 according to this example, therefore, can facilitate and prompt tuning of the tuner 34 to a desired station.

While the above description has been given in connection with an example for the manual input device 1A according to the first embodiment, the use of one of the manual input devices 1B to 1D according to the second to fourth embodiments can also provide the same advantages as described above.

Embodiment of Vehicle-Mounted Equipment Controller

Figure 14:
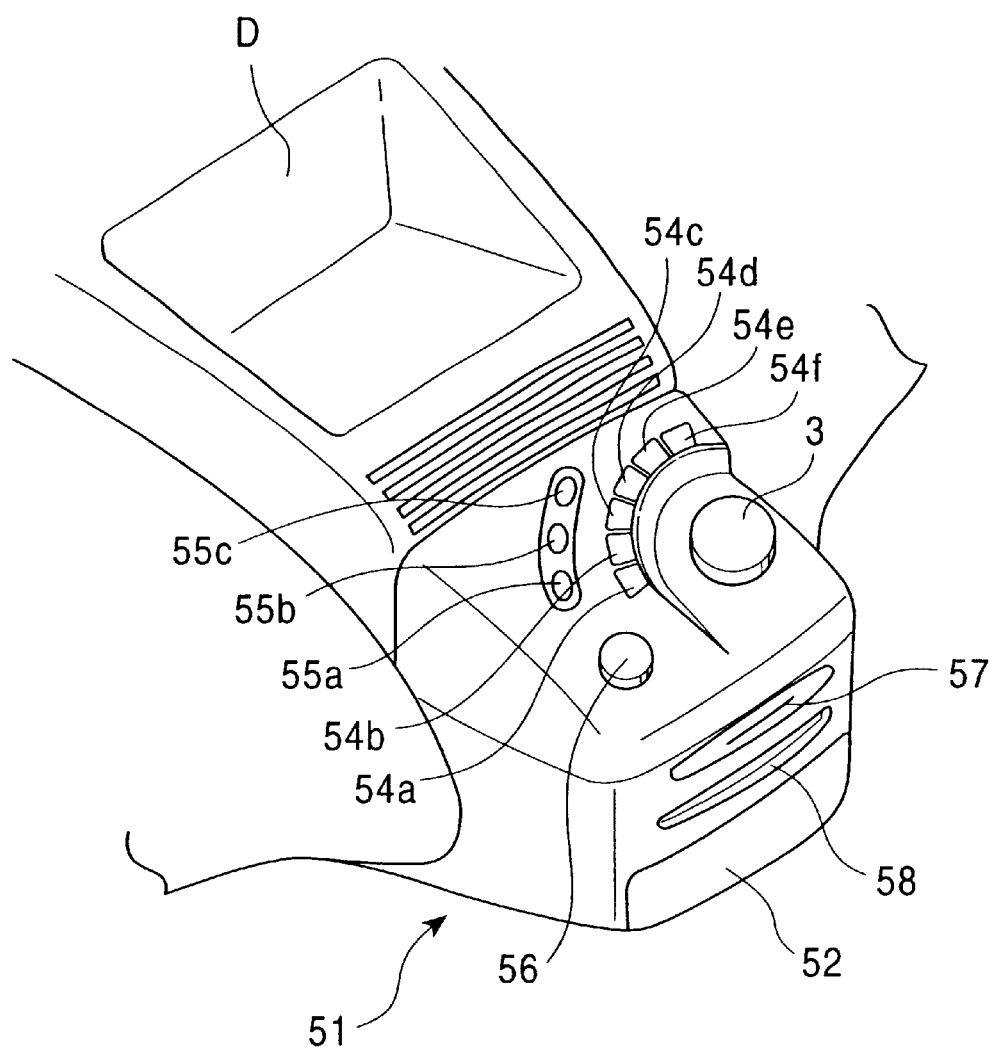
FIG. 14 is a perspective view showing a main portion of a dashboard in which a vehicle-mounted equipment controller according to an embodiment of the present invention is incorporated.
Figure 15:
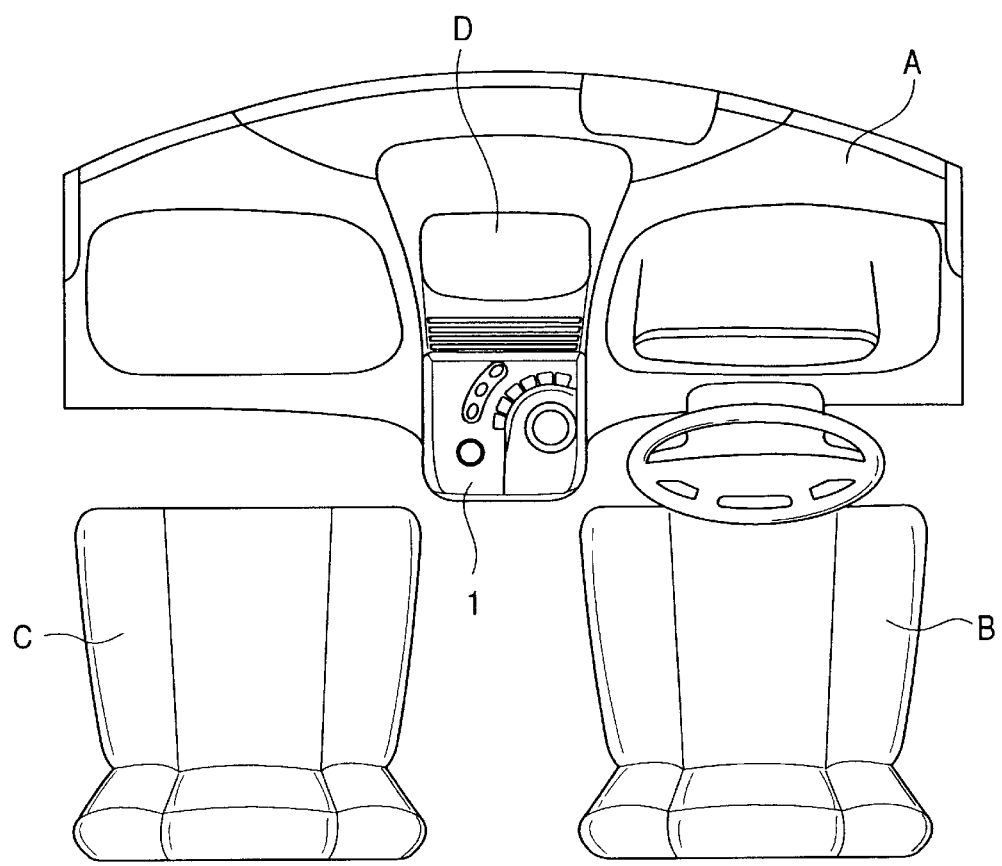
FIG. 15 is a plan view showing a main portion of the interior of an automobile in which the vehicle-mounted equipment controller according to the embodiment of the present invention is incorporated.
Figure 16:
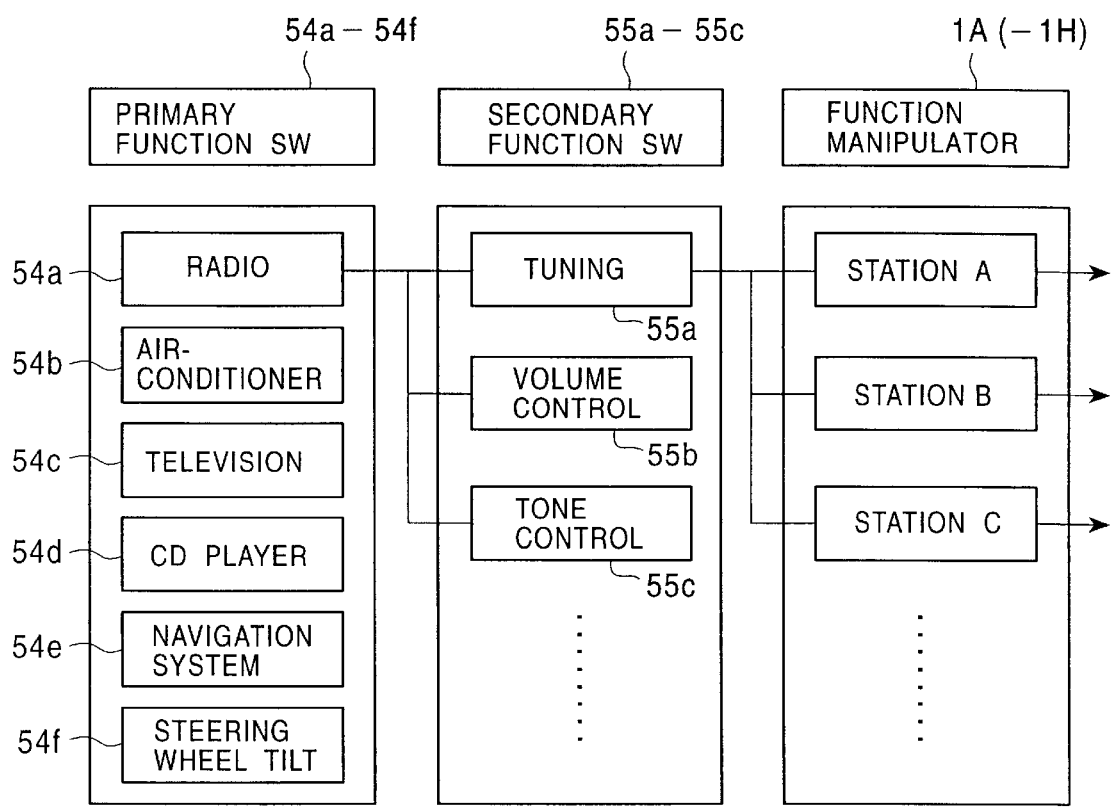
FIG. 16 is a functional block diagram of the vehicle-mounted equipment controller according to the embodiment of the present invention.
Figure 17:
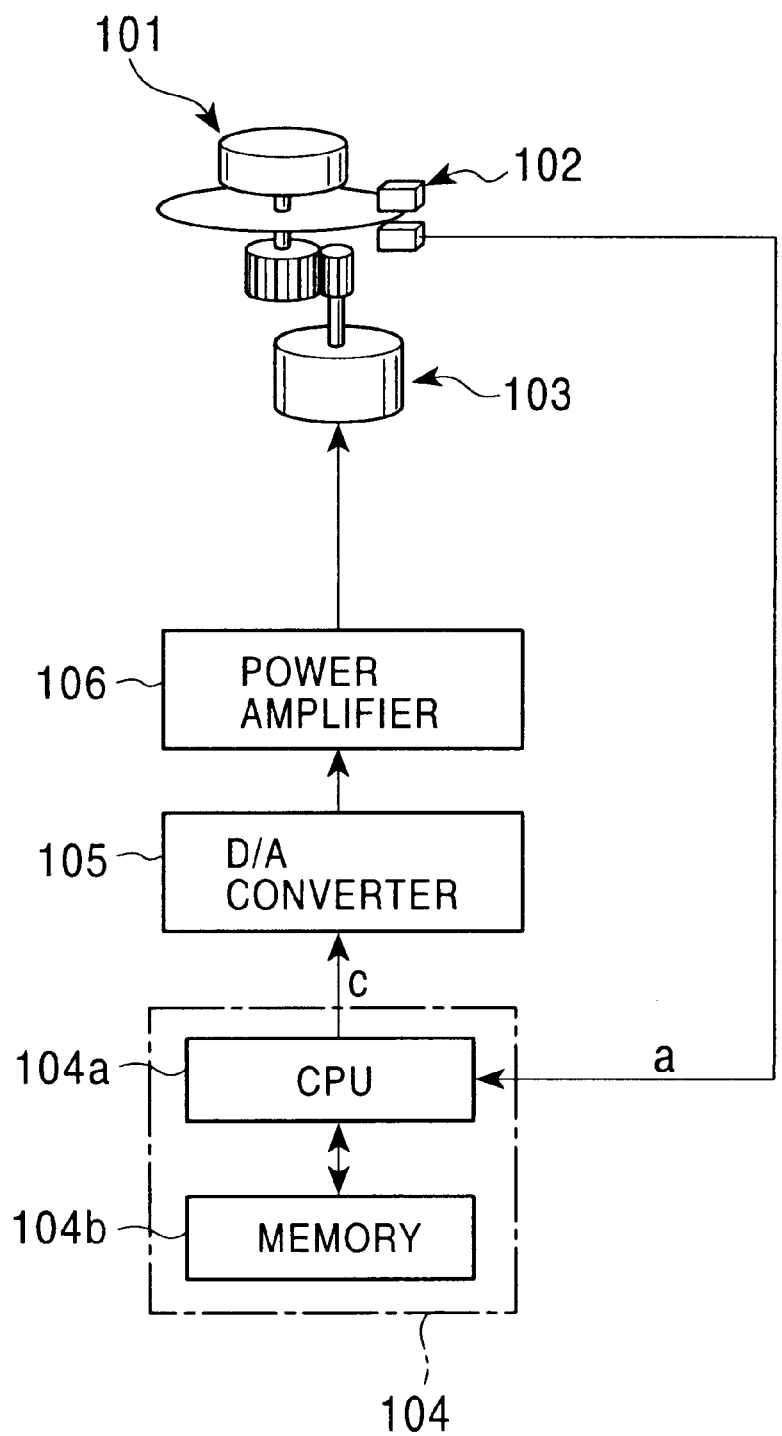
FIG. 17 is a block diagram of a manual input device according to the known art.

An embodiment of the vehicle-mounted equipment controller according to the present invention will now be described with reference to FIGS. 14 to 16. FIG. 14 is a perspective view showing the main portion of a dashboard in which a vehicle-mounted equipment controller 51 according to this embodiment is incorporated. FIG. 15 is a plan view showing the main portion of the interior of a vehicle in which the vehicle-mounted equipment controller 51 according to this embodiment is incorporated. FIG. 16 is a functional block diagram of the vehicle-mounted equipment controller 51 according to this embodiment.

Referring now to FIG. 14, The vehicle-mounted equipment controller 51 according to this embodiment includes a housing 52 formed into a box-like container in a required size. One of the manual input devices 1A to 1H according to the first to eighth embodiments is incorporated in the housing 52. The knob 3 of one of the manual input devices 1A to 1H is provided at the upper part of the housing 52. On the upper surface of the housing 52, six push-button switches 54a, 54b, 54c, 54d, 54e, and 54f are arranged substantially in an arc form about the center of the knob 3. At the outer peripheral of the portion where the group of six push-button switches is arranged, three push-button switches 55a, 55b, and 55c substantially coaxial with the six push-button switches are also arranged in conjunction with a volume control 56. In the front surface of the housing 52, a card slot 57 and a disk slot 58 are provided.

The vehicle-mounted equipment controller is arranged, as shown in FIG. 15, between the driver's seat B and the passenger's seat C in a dashboard A.

The six push-button switches 54a to 54f arranged in the arc form is electric equipment selection switches for selecting vehicle-mounted equipment to be controlled by the vehicle-mounted equipment controller 51 of this embodiment. The vehicle-mounted equipment may include a radio, air-conditioner, TV, CD player, car navigation system, steering wheel tilt, seat positioning device, and telephone. The push-button switches 54a to 54f are independently connected to each type of the vehicle-mounted equipment. In this vehicle-mounted equipment controller 51 of this embodiment, as shown in FIG. 16, the push-button switch 54a is connected to a radio 54a, the push-button switch 54b to an air-conditioner 54b, the push-button switch 54c to a TV 54c, the push-button switch 54d to a CD player 54d, the push-button switch 54e to a car navigation system 54e, and the push-button switch 54f to a steering wheel tilt 54f. Thus, pressing a desired push-button switch allows selection of one type of the vehicle-mounted electric equipment connected to the push-button switches 54a to 54f.

The three push-button switches 55a to 55c arranged at the peripheral of the six push-button switches 54a to 54f are function selection switches for selecting functions of the vehicle-mounted equipment that is selected by the operation of the six push-button switches 54a to 54f. For example, as shown in FIG. 16, when the radio is selected with a push-button switch 54a, the three push-button switches 55a to 55c function as a tuner selection switch, volume selection switch, and tone selection switch, respectively. Naturally, depending upon the types of vehicle-mounted electric equipment selected with the push-button switches 54a to 54f, the types of functions that are selectable with the push-button switches 55a to 55c vary. The manual input device 1A (to 1H) incorporated in the housing 52 is used as means for adjusting functions selected with the push-button switches 55a to 55c. For example, when the tuner of the radio is selected with the push-button switch 55a, manipulating the knob 3 allows for tuning into radio stations. Since the operation of tuning into a radio station and force feedback control effected during the operation are analogous to those explained in the previous column (the forth application embodiment of the manual input device), the description thereof will be omitted.

Accordingly, the vehicle-mounted equipment controller of this embodiment allows for central control of a plurality of types of vehicle-mounted electric equipment. This can facilitate the adjustment of functions of each type of the vehicle-mounted electric equipment, thus leading to enhanced safety during the operation of the automobile. In addition, the vehicle-mounted equipment controller is configured such that the operation feeling of the knob 3 is controlled depending on the status of the vehicle-mounted electric equipment to be adjusted, thereby making it possible to provide improved operability of the knob 3. The vehicle-mounted equipment controller, therefore, can be used to facilitate and secure the adjustment of functions of electric equipment to be operated.

What is claimed is:

1. A manual input device, comprising:
   a knob to operate an external device;
   an actuator to apply force to said knob;
   a control portion to control said actuator,
   a sensor to detect an operation state of said knob; and
   an input/output portion to send a first signal to the external device and to receive a second signal from the external device,
   wherein the external device is connected to an external sensor that outputs an external signal, and said control portion receives, at least, the external signal to generate a control signal for said actuator, the control signal corresponding to the external signal, thereby controlling said actuator.

2. A manual input device, comprising:
   a knob to operate an external device;
   an actuator to apply force to said knob;
   a control portion to control said actuator;

a sensor to detect an operation state of said knob; and an input/output portion to send a first signal to the external device and to receive a second signal from the external device, wherein, upon receipt of both of a detection signal outputted from said sensor and an external signal outputted from an external sensor, the external device generates control information for said actuator, the control information corresponding to, at least, the external signal, and transmits the control information to said control portion through said input/output portion, and said control portion generates a control signal for said actuator, the control signal corresponding to the control information, thereby controlling said actuator.

3. A manual input device, comprising:

a knob to operate an external device;

an actuator to apply force to said knob;

a sensor to detect an operation state of said knob; and an input/output portion to send a first signal to the external device and to receive a second signal from the external device, wherein, upon receipt of both of a detection signal outputted from the sensor and an external signal outputted from an external sensor, the external device generates control information for said actuator, the control information corresponding to, at least, the external signal, thereby controlling said actuator.

4. A manual input device, comprising:

a knob to operate an external device;

an actuator to apply force to said knob;

a sensor to detect an operation state of said knob; and an input/output portion to send a first signal to the external device and to receive a second signal from the external device, wherein the external device is connected to an external sensor that outputs an external signal, and said actuator is controlled by a control signal generated in accordance with the external signal.

5. A vehicle-mounted equipment controller, comprising;

at least one function selection switch to select a function from among a plurality of various functions to be adjusted; and a manual input device to adjust the function selected with said function selection switch, said manual input device comprising:
  a knob to operate an external device;
  an actuator to apply force to said knob;
  a control portion to control said actuator;
  a sensor to detect an operation state of said knob; and
  an input/output portion to send a first signal to the external device and to receive a second signal from the external device, wherein the external device is connected to an external sensor that outputs an external signal, and said control portion receives, at least, the external signal to generate a control signal for said actuator, the control signal corresponding to the external signal, thereby controlling said actuator.

6. A vehicle-mounted equipment controller, comprising:

at least one function selection switch to select a function from among a plurality of various functions to be adjusted; and a manual input device to adjust the function selected with said function selection switch, said manual input device comprising:
  a knob to operate an external device;
  an actuator to apply force to said knob;
  a control portion to control said actuator;
  a sensor to detect an operation state of said knob; and
  an input/output portion to send a first signal to the external device and to receive a second signal from the external device, wherein, upon receipt of both of a detection signal outputted from said sensor and an external signal outputted from an external sensor, the external device generates control information for said actuator, the control information corresponding to, at least, the external signal, and transmits the control information to said control portion through said input/output portion, and said control portion generates a control signal for said actuator, the control signal corresponding to the control information, thereby controlling said actuator.

7. A vehicle-mounted equipment controller, comprising:

at least one function selection switch to select a function from among a plurality of various functions to be adjusted; and a manual input device to adjust the function selected with said function selection switch, said manual input device comprising:
  a knob to operate an external device;
  an actuator to apply force to said knob;
  a sensor to detect an operation state of said knob; and
  an input/output portion to send a first signal to the external device and to receive a second signal from the external device, wherein, upon receipt of both of a detection signal outputted from said sensor and an external signal outputted from an external sensor, the external device generates control information for said actuator, the control information corresponding to, at least, the external signal, thereby controlling said actuator.

8. A vehicle-mounted equipment controller, comprising:

at least one function selection switch to select a function from among a plurality of various functions to be adjusted; and a manual input device to adjust the function selected with said function selection switch, said manual input device comprising:
  a knob to operate an external device;
  an actuator to apply force to said knob;
  a sensor to detect an operation state of said knob; and
  an input/output portion to send a first signal to the external device and to receive a second signal from the external device, wherein the external device is connected to an external sensor that outputs an external signal, and said actuator is controlled by a control signal generated in accordance with the external signal.

9. A manual input device according to claim 1, wherein said sensor is coupled to an operation shaft of said knob, and said knob and said actuator are coupled via a power transmission portion.

10. A manual input device according to claim 1, wherein said sensor is coupled to a drive shaft of said actuator, and said knob and said actuator are coupled via a power transmission portion.

11. A manual input device according to claim 1, wherein said sensor is coupled with said knob via a power transmission portion.

12. A manual input device according to claim 1, wherein said knob is arranged so as to pivot in at least two directions, and said actuator comprises at least one actuator for each direction in which said knob is pivoted.

13. A manual input device according to claim 9, wherein said knob extends in a direction perpendicular to the operation shaft of said knob, and said knob is rotated within a plane perpendicular to the operation shaft.

14. A manual input device according to claim 9, wherein the operation shaft of said knob is arranged in a horizontal direction, and said knob extends in a direction perpendicular to the operation shaft and is rotated within a plane perpendicular to the operation shaft.

15. A manual input device according to claim 11, wherein said knob is a slide-type knob that is slidably operated, and the power transmission portion is integrally formed with said knob.

16. A manual input device according to claim 11, wherein said knob is a slide-type knob that is slidably operated, the power transmission portion is integrally formed with said knob, and the sensor is provided between said knob and said actuator.

17. A manual input device according to claim 12, wherein a sensor is provided for each direction in which said knob is pivoted.

18. A manual input device, comprising:
a knob to operate an external device;
a sensor to detect an operation state of the knob and output a sensor signal in accordance with the operation state of the knob;
an actuator to apply force to the knob, the actuator controlled by a control signal that is dependent on both the operation state of the knob and a status of the external device; and
an input/output portion to transmit and receive signals between the manual input device and the external device.

19. The manual input device of claim 18, further comprising a control portion to supply the control signal.

20. The manual input device of claim 19, wherein the external device comprises an external sensor, and an output of the external sensor is transmitted to the input/output portion as the status of the external device.

21. The manual input device of claim 19, wherein the external device comprises an external sensor, control information is based on an output of the external sensor and has a simpler data structure than that of the output of the external sensor, and the control information is transmitted to the input/output portion as the status of the external device.

22. The manual input device of claim 18, wherein the control signal is transmitted from the external device.

23. The manual input device of claim 19, wherein the external device comprises a plurality of external sensors having outputs that are received by the input/output portion as the status of the external device.

24. The manual input device of claim 19, wherein the external device comprises a plurality of external sensors, control information is based on outputs of the external sensors, the control information has a simpler data structure than that of the outputs of the external sensors, and the control information is received by the input/output portion as the status of the external device.

25. The manual input device of claim 22, wherein the external device comprises a plurality of external sensors and a control portion that receives outputs of the external sensors and transmits the control signal.

26. The manual input device of claim 22, wherein the external device comprises a control portion to supply the control signal.

27. The manual input device of claim 20, wherein the external device comprises a control portion that receives the output of the external sensor and transmits the output of the external sensor to the input/output portion.

28. The manual input device of claim 21, wherein the external device comprises a control portion to supply the control information.

29. The manual input device of claim 23, wherein the external device comprises a control portion that receives the outputs of the external sensors and transmits the outputs of the external sensors to the input/output portion.

30. The manual input device of claim 24, wherein the external device comprises a control portion to supply the control information.

31. The manual input device of claim 18, wherein the input/output portion receives only one signal from the external device as the status of the external device.

32. The manual input device of claim 19, wherein the input/output portion receives only one signal from the external device as the status of the external device.

33. The manual input device of claim 18, wherein the input/output portion receives a plurality of signals from the external device as the status of the external device.

34. The manual input device of claim 19, wherein the input/output portion receives a plurality of signals from the external device as the status of the external device.

35. The manual input device of claim 18, wherein the external device comprises a transmission, an external actuator to drive the transmission, a first external sensor to detect a driving state of the external actuator and supply a driving state output, and a second external sensor to detect revolutions per minute (RPM) of the transmission and supply a RPM output, and the driving state output and RPM output are received by the input/output portion as the status of the external device.

36. The manual input device of claim 19, wherein the external device comprises a transmission, an external actuator to drive the transmission, a first external sensor to detect a driving state of the external actuator and supply a driving state output, and a second external sensor to detect revolutions per minute (RPM) of the transmission and supply a RPM output, and the driving state output and RPM output are received by the input/output portion as the status of the external device.

37. The manual input device of claim 18, wherein the external device comprises a transmission, an external actuator to drive the transmission, an external control portion, a first external sensor to detect a driving state of the external actuator and supply a driving state output, and a second external sensor to detect revolutions per minute (RPM) of the transmission and supply a RPM output, and the control portion receives and transforms the driving state output and RPM output into the control signal.

38. The manual input device of claim 18, wherein the external device comprises a tuner, an external actuator to drive the tuner, a first external sensor to detect an actuation status of the external actuator and supply an actuation status output, and a second external sensor to detect when the tuner is tuned to a station and supply tuning output, and the actuation status output and tuning output are received by the input/output portion as the status of the external device.

39. The manual input device of claim 19, wherein the external device comprises a tuner, an external actuator to drive the tuner, a first external sensor to detect an actuation status of the external actuator and supply an actuation status output, and a second external sensor to detect when the tuner is tuned to a station and supply tuning output, and the actuation status output and tuning output are received by the input/output portion as the status of the external device.

40. The manual input device of claim 18, wherein the external device comprises a tuner, an external control portion, an external actuator to drive the tuner, a first external sensor to detect an actuation status of the external actuator and supply an actuation status output, and a second external sensor to detect when the tuner is tuned to a station and supply tuning output, the external control portion receives and transforms the actuation status output and tuning output into control information received by the input/output portion as the status of the external device, and the control information has a simpler data structure than that of the actuation status output and tuning output.

41. The manual input device of claim 19, wherein the external device comprises a tuner, an external actuator to drive the tuner, an external control portion, a first external sensor to detect an actuation status of the external actuator and supply an actuation status output, and a second external sensor to detect when the tuner is tuned to a station and supply tuning output, the external control portion receives and transforms the actuation status output and tuning output into control information received by the input/output portion as the status of the external device, and the control information has a simpler data structure than that of the actuation status output and tuning output.

42. The manual input device of claim 18, wherein the external device comprises a tuner, an external control portion, an external actuator to drive the tuner, a first external sensor to detect an actuation status of the external actuator and supply an actuation status output, and a second external sensor to detect when the tuner is tuned to a station and supply tuning output, the external control portion receives and transforms the actuation status output and tuning output into the control signal.

43. The manual input device of claim 38, wherein the actuator applies force to the knob when the tuner is tuned to a station.

44. The manual input device of claim 39, wherein the actuator applies force to the knob when the tuner is tuned to a station.

45. The manual input device of claim 40, wherein the actuator applies force to the knob when the tuner is tuned to a station.

46. The manual input device of claim 41, wherein the actuator applies force to the knob when the tuner is tuned to a station.

47. The manual input device of claim 42, wherein the actuator applies force to the knob when the tuner is tuned to a station.

* * * * *

UNITED STATES PATENT AND TRADEMARK OFFICE
CERTIFICATE OF CORRECTION

PATENT NO. : 6,591,175 B2
DATED : July 8, 2003
INVENTOR(S) : Hidetaka Numata et al.

It is certified that error appears in the above-identified patent and that said Letters Patent is hereby corrected as shown below:

<u>Column 20,</u>
Line 45, after claim "36", insert the following claims:

--37. The manual input device of Claim 18, wherein the external device comprises a transmission, an external actuator to drive the transmission, an external control portion, a first external sensor to detect a driving state of the external actuator and supply a driving state output, and a second external sensor to detect revolutions per minute (RPM) of the transmission and supply a RPM output, the external control portion receives and transforms the driving state output and RPM output into control information received by the input/output portion as the status of the external device, and the control information has a simpler data structure than that of the driving state output and RPM output.

38. The manual input device of Claim 19, wherein the external device comprises a transmission, an external actuator to drive the transmission, an external control portion, a first external sensor to detect a driving state of the external actuator and supply a driving state output, and a second external sensor to detect revolutions per minute (RPM) of the transmission and supply a RPM output, the external control portion receives and transforms the driving state output and RPM output into control information received by the input/output portion as the status of the external device, and the control information has a simpler data structure than that of the driving state output and RPM output.--.

Line 45, Claim "37" should be renumbered as -- 39 --.
Line 54, Claim "38" should be renumbered as -- 40 --.
Line 63, Claim "39" should be renumbered as -- 41 --.

UNITED STATES PATENT AND TRADEMARK OFFICE
CERTIFICATE OF CORRECTION

PATENT NO.     : 6,591,175 B2
DATED          : July 8, 2003
INVENTOR(S)    : Hidetaka Numata et al.

It is certified that error appears in the above-identified patent and that said Letters Patent is hereby corrected as shown below:

<u>Column 21,</u>
Line 3, Claim "40" should be renumbered as -- 42 --.
Line 15, Claim "41" should be renumbered as -- 43 --.

<u>Column 22,</u>
Lines 1, Claim "42" should be renumbered as -- 44 --.
Line 10, Claim "43" should be renumbered as -- 45 --.
Line 13, Claim "44" should be renumbered as -- 46 --.
Line 16, Claim "45" should be renumbered as -- 47 --.
Line 19, Claim "46" should be renumbered as -- 48 --.
Line 22, Claim "47" should be renumbered as -- 49 --.

Signed and Sealed this

Eleventh Day of May, 2004

JON W. DUDAS
*Acting Director of the United States Patent and Trademark Office*